United States Patent
Kawase et al.

(12)

(10) Patent No.: US 6,404,182 B1
(45) Date of Patent: Jun. 11, 2002

(54) METHOD FOR DETECTING THE MAGNETIC FIELD OF A TIRE

(75) Inventors: Masahiro Kawase, Higashimatsuyama; Shinichi Tazaki, Isezaki, both of (JP)

(73) Assignee: Canon Denshi Kabushiki Kaisha, Tokyo (JP)

(*) Notice: Subject to any disclaimer, the term of this patent is extended or adjusted under 35 U.S.C. 154(b) by 0 days.

(21) Appl. No.: 09/599,418

(22) Filed: Jun. 22, 2000

Related U.S. Application Data

(62) Division of application No. 08/937,560, filed on Sep. 25, 1997, now Pat. No. 6,104,593.

(30) Foreign Application Priority Data

| Sep. 27, 1996 | (JP) | ................................................ 8-255857 |
| Jan. 14, 1997 | (JP) | ................................................ 9-004212 |
| May 6, 1997 | (JP) | ................................................ 9-115405 |
| Jun. 23, 1997 | (JP) | ................................................ 9-165443 |
| Aug. 6, 1997 | (JP) | ................................................ 9-211493 |

(51) Int. Cl.$^7$ .................... G01P 3/487; G01R 33/02; B60C 13/00
(52) U.S. Cl. .................... 324/173; 324/174; 324/166; 73/514.39; 340/441
(58) Field of Search .................... 324/160, 163–166, 324/173, 174, 207.13, 207.15–207.22, 207.25, 249, 260; 73/514.39; 180/170; 340/441, 448, 466, 671, 672; 702/142, 145, 149; 361/143

(56) References Cited

U.S. PATENT DOCUMENTS

| 3,768,532 A | 10/1973 | Arai | ........................... 152/151 |
| 4,570,152 A | * 2/1986 | Melton et al. | ............... 340/449 |
| 4,745,363 A | 5/1988 | Carr et al. | ................ 324/207.2 |
| 4,851,771 A | 7/1989 | Ikeda et al. | ............ 324/207.21 |

FOREIGN PATENT DOCUMENTS

| CH | 559 367 | 2/1975 |
| DE | 39 42 573 A1 | 6/1991 |
| EP | 0 049 893 | 4/1982 |
| EP | 590 190 A1 | 6/1994 |
| EP | 0 833 162 A2 | 4/1998 |
| JP | 57-69368 | 4/1982 |
| JP | 57-69369 | 4/1982 |
| JP | 10-115627 | 5/1998 |

OTHER PUBLICATIONS

European Search Report EP 97 11 6782 dated Nov. 5, 1998.
European Search Report EP 97 11 6782 (Feb. 17, 1999).

* cited by examiner

*Primary Examiner*—Jay Patidar
(74) *Attorney, Agent, or Firm*—Morgan & Finnegan, L.L.P.

(57) ABSTRACT

A first portion of a perimeter of an outer circumferential portion of a tire is magnetized with a first polarity along the steel belt in one circumferential direction less than 360° and a second portion of the perimeter is magnetized with a second polarity in an opposite circumferential direction. The magnetic field generated by the magnetized steel belt is detected by two magnetic detection elements, which are set so that the magnetic field detection directions of the two magnetic detection elements are parallel to the side surface of the tire, and the two elements are juxtaposed in a direction perpendicular to the side surface of the tire.

4 Claims, 32 Drawing Sheets

MAGNETIC FIELD PATTERN
OBTAINED UPON
COMPLETION OF SECOND
MAGNETIZATION PROCESS

MAGNETIC FIELD PATTERN
OBTAINED UPON
COMPLETION OF THIRD
MAGNETIZATION PROCESS

METHOD FOR DETECTING THE MAGNETIC FIELD OF A TIRE

This is a divisional of prior application Ser. No. 08/937,560, filed Sep. 25, 1997 now U.S. Pat. No. 6,104,593.

BACKGROUND OF THE INVENTION

1. Field of the Invention

The present invention relates to a tire magnetization method, a tire magnetized by the tire magnetization method, a tire magnetic field detection method, a tire revolution detection signal processing method, and a tire revolution detection apparatus and, more particularly, to a tire magnetization method for magnetically detecting the revolution or revolution speed (revolution per minute (rpm)) of a wheel or tire so as to measure the speed, the distance traveled, and the like of a vehicle such as an automobile or the like on the basis of the revolution speed of the tire of the vehicle, a tire magnetized by the tire magnetization method, a tire magnetic field detection method, a tire revolution detection signal processing method, and a tire revolution detection apparatus.

2. Description of Related Art

Car navigation systems used for confirming the current position of a vehicle, navigating a vehicle, and so on have come into existence in about 1990, and have become popular.

A car navigation system has a function of detecting absolute position on the basis of radio waves from a satellite by GPS (GLOBAL POSITIONING SYSTEM) navigation. In recent years, systems using a hybrid system with a self-contained navigation that indicates the traveling condition of a vehicle on the basis of the angular deviation detected by a gyro sensor and vehicle speed data from the vehicle main body have increased and become dominant. The hybrid system can improve map matching precision.

However, in order to obtain the self-contained navigational function, vehicle speed data must be acquired from the vehicle main body. For this purpose, a user must ask an expert having the diagram of the vehicle main body for connecting the system. Such connections are hard to do by an average user, and high cost and connections requiring an expert prevents wider user of car navigation systems in the future.

SUMMARY OF THE INVENTION

The above-mentioned problems can be solved if a sensor that detects the revolution or revolution speed of a tire to measure the vehicle speed or distance traveled, and can be easily attached can be supplied. As an ideal method, it is most preferable to detect the revolution or revolution speed of the tire in a non-contact manner.

The present inventors consider the fact that steel radial tires have become popular, and such tire has a steel belt inside the outer circumferential portion. The steel belt itself has residual magnetization albeit its weak strength, and this residual magnetization radiates a magnetic field outside the tire. In fact, when the magnetic field was measured by rotating the tire once, a magnetic field distribution shown in FIG. 10 appeared. The measurement of the magnetic field was done along the outer circumferential portion at a position about 15 cm from the tire. As can be seen from FIG. 10, a clear peak is present in correspondence with one revolution of the tire, and feasibility of magnetic detection of the revolution of the tire is suggested.

However, the peak-to-peak value of the magnetic field from the tire is about 0.38 G, and is smaller than geomagnetism (about 0.5 G). In some cases, the magnetic field may become smaller than 0.1 G depending on the types of tires and the setting positions of the sensor. Hence, a very weak magnetic field from such tire must be detected with high sensitivity.

In order to satisfactorily obtain magnetic detection of the revolution or revolution speed of such steel radial tire, the following conditions must be satisfied.

i) Sensor Arrangement

The sensitivity of a magnetic sensor requires several mG in consideration of resolution. On the other hand, the sensor does not change such as a flux gate sensor.

ii) Sensor Setting

The sensor must be easy to set in a vehicle. Also, the sensor must be set at a position suitable for magnetic field detection.

iii) Removal of Influences of Disturbances

Upon tire revolution detection during actual travel of a vehicle, the magnetic fields produced by residual magnetization of iron reinforcing rods, steel frames, and the like of bridges, tunnels, and the like act as disturbances. Hence, the influence of such magnetic fields that act as disturbances must be removed.

The present invention has been made in consideration of the above situation, and has as its object to provide a tire revolution detection method and apparatus which can satisfy the above-mentioned conditions, and satisfactorily attain magnetic detection of the revolution of a tire which includes a steel belt, and a tire revolution speed detection method, which can satisfactorily attain magnetic detection of the revolution speed of the tire.

It is another object of the present invention to provide a tire magnetization method suitable for magnetic revolution detection of a tire, a tire magnetized by the tire magnetization method, and a magnetic field detection method that can obtain a stable output waveform from the tire magnetized by the magnetization method.

It is still another object of the present invention to provide a tire revolution detection signal processing method, which can absorb not only level drifts of magnetic sensor outputs due to disturbances but also variations of sensor outputs depending on the distance between the tire and sensor, and is robust against waveform distortions of the sensor outputs.

When a magnetic field pattern includes a plurality of peaks per revolution of a tire, correction of a fraction of an integer must be done upon calculating the revolution speed of the tire by counting the number of peaks, and since the individual tires have different numbers of peaks, correction values must be set in units of tires.

In view of these problems, when magnetization of the tire is controlled to obtain a signal corresponding to a predetermined number of pulses, e.g., one pulse, magnetic detection of the tire revolution is facilitated.

The present invention has been made in consideration of the above situation, and has as its object to provide a tire magnetization method suitable for magnetic revolution detection of a tire, and a tire magnetized by the tire magnetization method and, more particularly, to find out the magnetization range angle that can maximize changes in magnetic field upon revolution of the tire. It is another object of the present invention to provide a tire magnetic field detection method which can obtain a stable output waveform from the magnetized tire.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The preferred embodiments of the present invention will be described in detail hereinafter with reference to the accompanying drawings.

[Basic Embodiment]

A tire revolution detection method and apparatus, and a tire revolution speed detection method according to the basic embodiment of the present invention will be explained below.

The arrangement and layout of a magnetic sensor used in tire revolution detection will be described below.

Figure 1A:
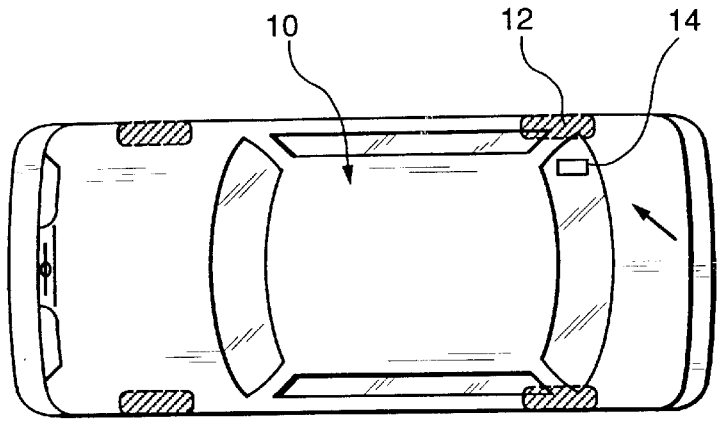
FIG. 1A is a top view of a vehicle showing the setting position of a magnetic sensor and the layout of magnetic detection elements (MI elements) in the vehicle according to an embodiment of the present invention.

In this embodiment, in a vehicle 10 shown in FIG. 1A, a tire 12 uses a steel radial tire which has a steel belt which serves as a magnetic field generation means inside the outer circumferential portion, and a magnetic sensor 14 serving as a magnetic field detection means is set in the vicinity of the rear side of the rear tire 12 in a trunk room or cabin of the vehicle 10. The magnetic sensor 14 may be set at the rear side of either the right or left rear tire 12. The sensor can be set at the front tire side. In this case, however, since the distance between the tire and sensor is not constant due to changes in angle of the tire upon operation of a steering wheel, the output waveform of the sensor drifts. Hence, this position is not suitable.

Note that the above description applies to a front-wheel driven vehicle, and the tire relationship is reversed in the case of a rear-wheel driven vehicle. That is, the sensor need only be set in the vicinity of a tire which is not steered. With this arrangement, since the changes in relative position between the steel belt (magnetic field generation means) and the magnetic sensor (magnetic field detection means) become small, stable magnetic field detection is attained.

In the above description, the steel belt is exemplified as the magnetic field generation means. Alternatively, another magnetic member inside a wheel to which the tire is attached may be used as the magnetic field generation means by, e.g., magnetizing a disk, wheel, or the like that constitute a braking device, or fixing a magnet.

Figure 1B:
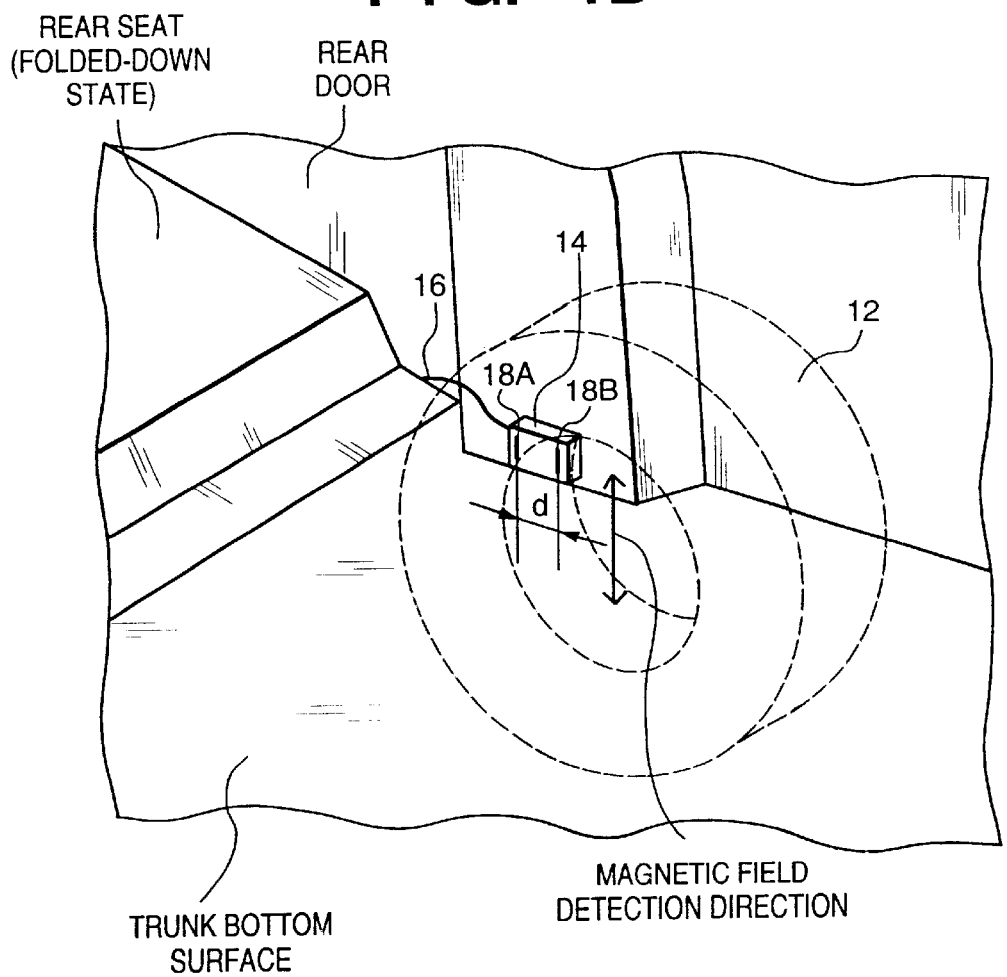
FIG. 1B is a perspective view of the interior of a trunk room of the vehicle showing the setting position of the magnetic sensor and the layout of the magnetic detection elements (MI elements) in the vehicle according to the embodiment of the present invention.

The setting position will be described in detail below with reference to FIG. 1B as an enlarged perspective view along the arrow in FIG. 1A. As shown in FIG. 1B, the sensor 14 is set at a position on a trunk side wall or bottom wall, which corresponds to the vicinity of the rear side of the tire 12 and is separated about 15 cm from the outer circumferential portion of the tire 12. FIGS. 1A and 1B exemplify a passenger vehicle. Also, even in light cars, vans, recreational vehicles, a setting space is present in a cabin or trunk on the rear side of the rear tire, and a distance within 30 cm from the outer circumferential portion of the tire can be assured. Note that the sensor may also be arranged in the vicinity of a tire housing in a rear trunk.

The sensor is connected to a car navigation apparatus main body via a cable 16. Unlike a sensor arranged outside the vehicle body, the cable 16 can be easily extended via the cabin toward the car navigation apparatus main body.

The arrangement of the magnetic sensor 14 will be described below. The magnetic sensor 14 comprises a pair of magnetic detection elements 18A and 18B. As the magnetic detection elements 18A and 18B, a magnetic impedance element using the magnetic impedance effect (to be abbreviated as an MI element hereinafter) which is disclosed in Japanese Patent Laid-Open No. 7-181239 is suitable. The magnetic impedance effect is a phenomenon in which when RF currents in the MHz band are applied to an amorphous wire or magnetic thin film, the impedance across the two ends of a magnetic member hanges several 10% by an external -magnetic field, and the MI element has a practical sensitivity of several mG or more.

The MI element has the following advantages: the MI element has a sensitivity equal to or higher than a flux gate sensor and allows easy size reduction to a length of about several mm; and the MI element is strong against magnetization and operates stably under the circumstance that the external magnetic field changes to a large extent. Hence, the MI element is suitable for the sensor of this embodiment.

In this sensor, in order to eliminate the influences of external magnetic fields and to detect only the magnetic field from the tire, the two MI elements 18A and 18B are differentially operated. In order to effectively attain such differential operation, the two elements 18A and 18B are set so that their magnetic detection directions become parallel to each other or series each other. As for setting of the magnetic field detection direction, the magnetic field detection direction is set in a direction perpendicular to the trunk bottom surface, as indicated by an arrow in FIG. 1B. However, even if the magnetic field detection direction is set in other directions, there is no particular difference, and any directions may be selected.

Figure 2:
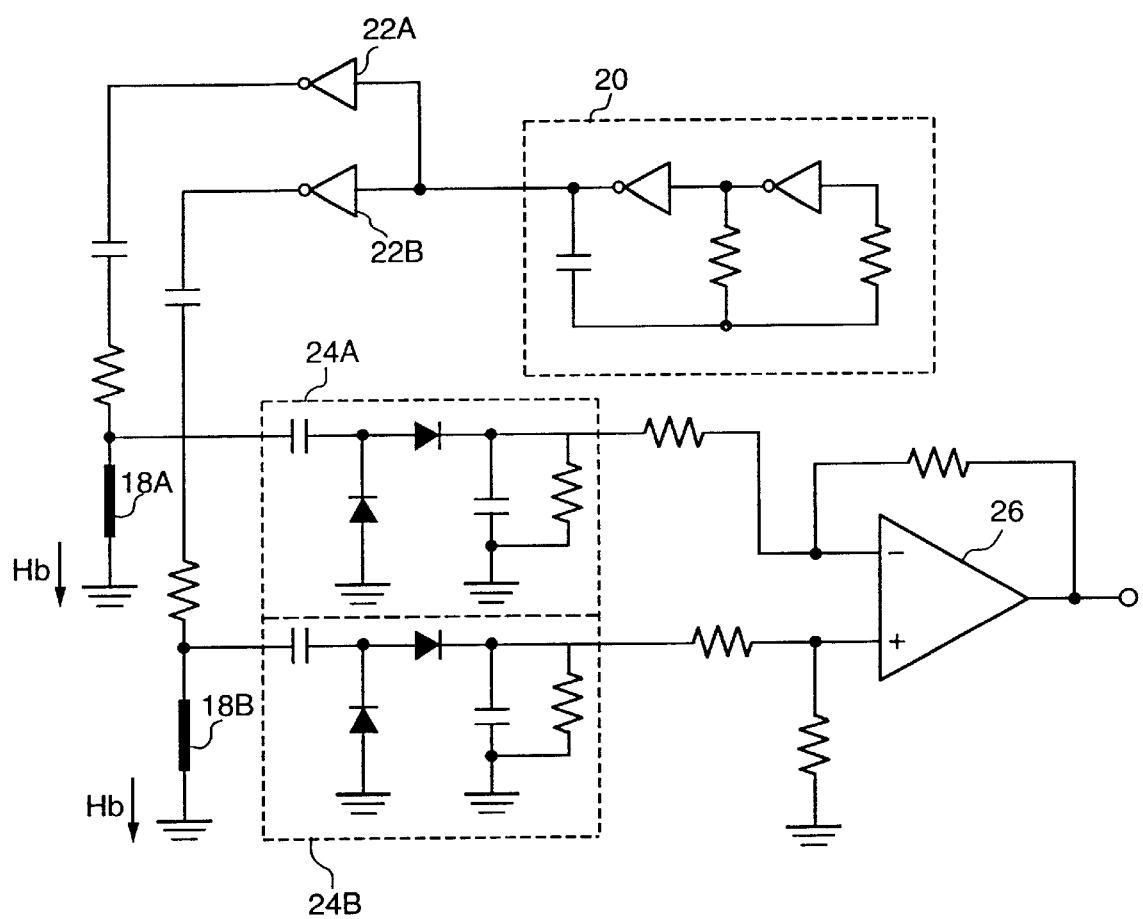
FIG. 2 is a circuit diagram showing the arrangement of a magnetic detection circuit of the magnetic sensor of the embodiment shown in FIGS. 1A and 1B.

A magnetic detection circuit of the magnetic sensor 14. for detecting the magnetic field from a tire using the MI elements 18A and 18B has an arrangement, as shown in FIG. 2. In this magnetic detection circuit, an RF. oscillation circuit 20 applies RF currents to the MI elements 18A and 18B via buffers 22A and 22B, thereby driving the MI elements 18A and 18B. The other end sides of the MI elements 18A and 18B are grounded. Changes in external magnetic field change the impedances of the MI elements 18A and 18B, and the voltage across the two terminals of each of the MI elements 18A and 18B changes. Signals indicating such changes in voltage are respectively detected by two detecting circuits 24A and 24B and are output as magnetic detection signals of the MI elements 18A and 18B. These detection signals are input to a differential amplifier circuit 26 and are differentially amplified. Note that a permanent magnet or coil applies a DC bias or magnetic field Hb of about 1 to 2 G to the MI elements 18A and 18B to assure sensitivity.

Figure 3:
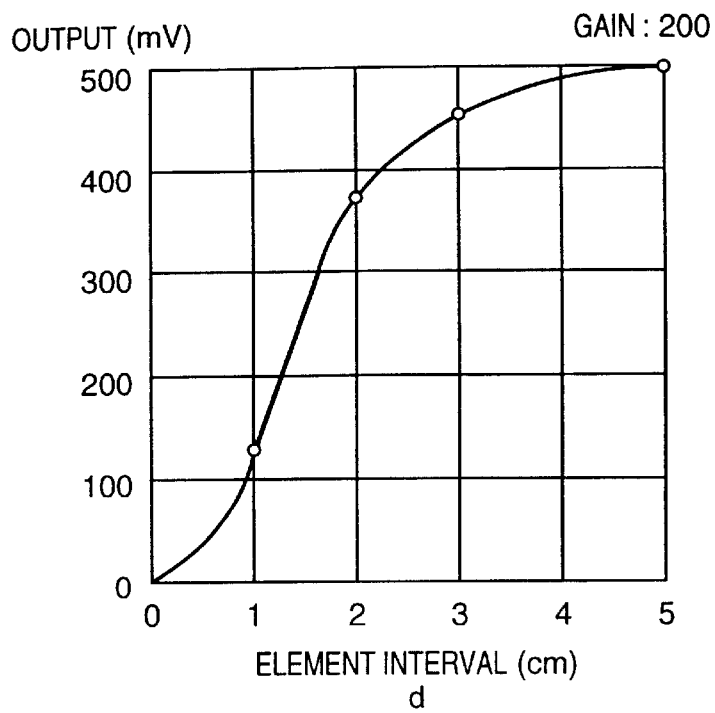
FIG. 3 is a graph showing the relationship between the interval d between the MI elements and the magnetic detection output of the magnetic sensor.

If the interval d between the MI elements 18A and 18B shown in FIG. 1B is too small, their outputs drop. Therefore, an appropriate interval must be selected. To this end, the magnetic field detection outputs upon revolution of the tire were measured by changing the interval d. As a result, as shown in FIG. 3, the output as a peak-to-peak value sharply drops when d<2 cm, but a practical output is obtained when d>2 cm.

Figure 4:
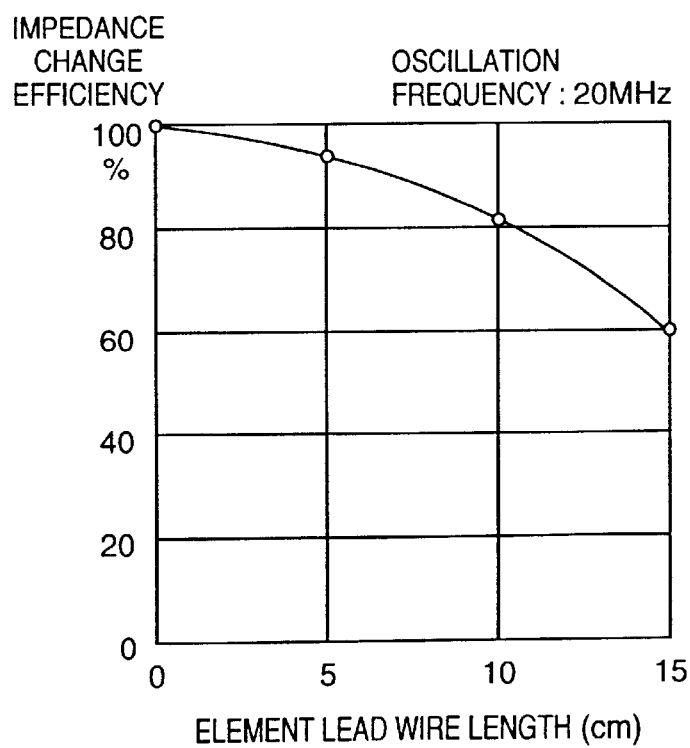
FIG. 4 is a graph showing the relationship between the lead wire length of the MI elements and the impedance change efficiency of the magnetic sensor.

When lead wires for connecting the MI elements to the magnetic detection circuit to apply RF currents to the MI elements 18A and 18B become too long, unwanted impedance components such as a floating capacitance and the like increase, and the impedance change efficiency drops. with increasing lead wire length,. as shown in FIG. 4. For this reason, if a drop to about 80% is allowed, the maximum lead wire length for each element is 10 cm, and the interval d between the elements should be set to be 20 cm or less. Hence, the interval d is preferably set to be within the range from 2 cm to 20 cm.

The measurement result of the sensor differential output when the tire is actually revolved with the above-mentioned sensor arrangement and layout will be explained below.

Figure 5:
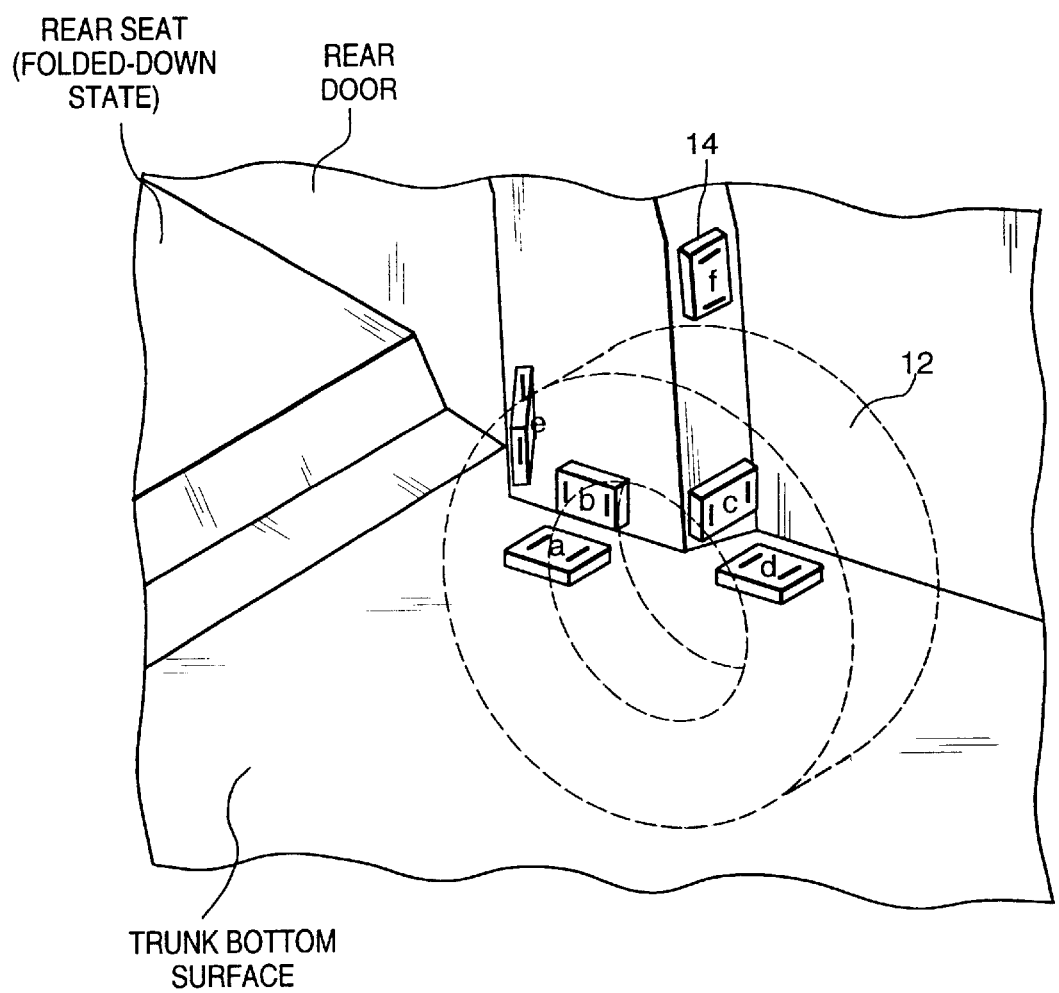
FIG. 5 is a perspective view of the interior of the trunk room showing different setting positions (measurement points) of the magnetic sensor in magnetic field change measurement tests upon revolution of a tire.
Figure 6:
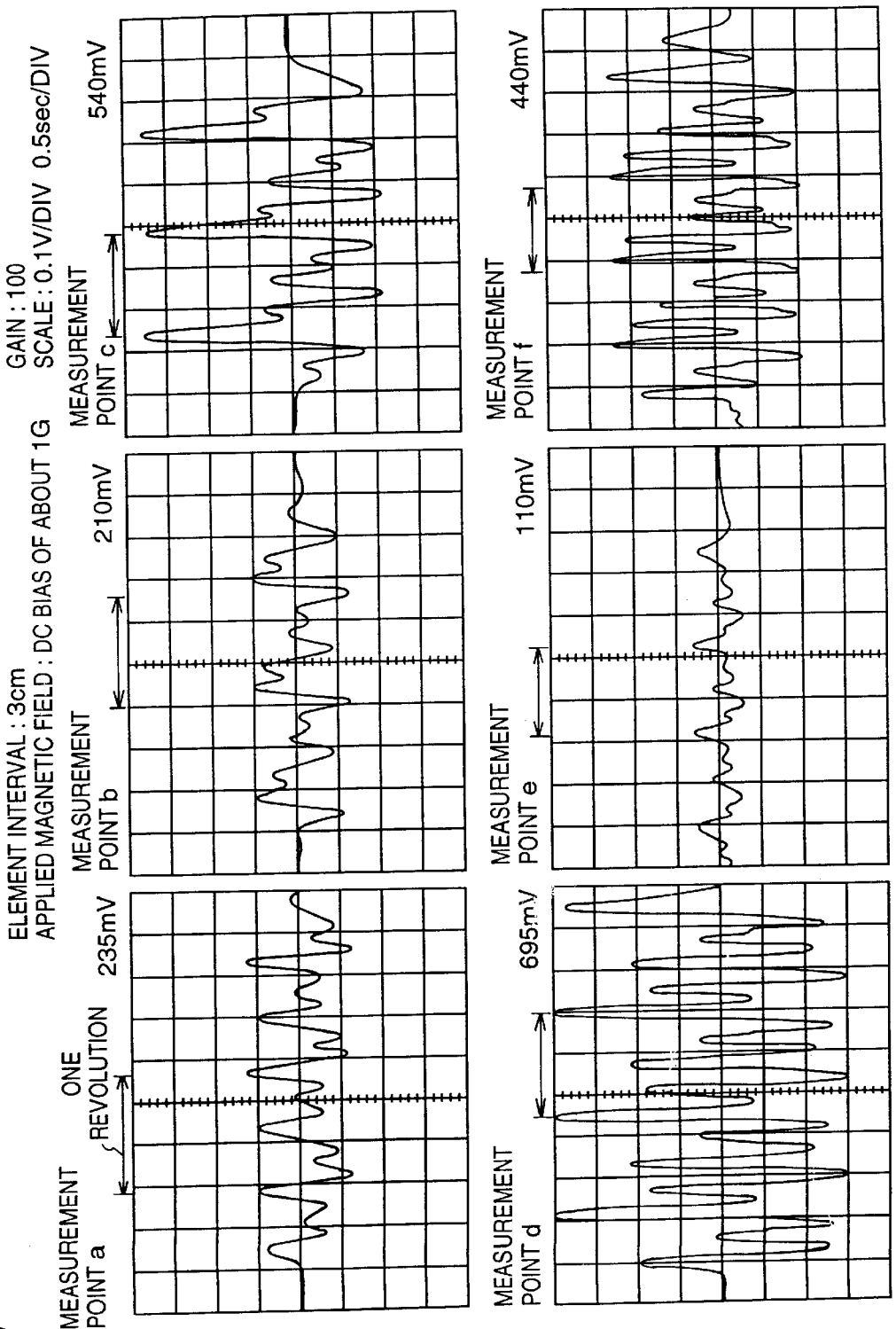
FIG. 6 shows oscillographs of the measurement results at the individual measurement points in the tests.

For measurements, a magnetic sensor, which used, as the MI elements 18A and 18B, two elements prepared by patterning an Fe—Ta—C-based magnetic thin film (thickness=2 $\mu$m) on a glass substrate, and set the elements at an interval d=3 cm, was fabricated. As the magnetic detection circuit, the circuit described above with the aid of FIG. 2 was used, and was built in the sensor. The magnetic sensor 14 was set at six points (a) to (f) in the vicinity of the rear side of the rear tire 12 in the trunk room, as shown in FIG. 5, and the differential outputs were measured. The measurement conditions were: RF currents of 20 MHz were applied to the MI elements 18A and 18B while applying a DC bias magnetic field of 1 G thereto, and the gain of the differential amplifier circuit 26 was set to be 100. FIG. 6 shows the measurement results.

The waveform at the point (a) will be explained below. The range indicated by a double-headed arrow corresponds to one revolution, and four each positive and negative peaks are present within that range. Of these peaks, two positive peaks are large ones. The SIGNAL/NOISE ratio (to be abbreviated as an S/N ratio hereinafter) is satisfactory.

At the point (b), the waveform is similar to that at the point (a) although the magnetic field detection direction is different from (a) by 90° and the polarities of peaks are vertically inverted in relation to the polarity of the bias magnetic field.

At the points (c), (d), and (f), the outputs are twice or more than the point (a) since these points are closer to the outer circumferential portion of the tire than the point (a).

Conversely, at the point (e), the output is about half that at the point (a) since the point (e) is farther than the point (a).

The low output can be compensated for by increasing the amplifier gain. However, the low output is originally accounted for by a small magnetic field from the tire, and a large difference between that magnetic field and an external magnetic field cannot be assured, resulting in large variations of the waveform.

Hence, as the setting position of the sensor, a position as close as possible to the outer circumferential portion of the tire where the steel belt is buried should be selected to assure a high output.

In view of the above-mentioned facts, a sensor arrangement that can detect the magnetic field from a tire at high sensitivity, and a preferred setting position of the sensor have been found. A method of detecting the revolution speed of a tire will be described below.

FIG. 6 shows the measurement results of the magnetic field from the tire in a stable situation free from any disturbance magnetic field. In this situation, it is easy to count zero-crossing points or points crossing a certain threshold value, and to calculate the revolution speed from the number of pulses per revolution.

However, in actual vehicle maneuvering, swell-like level drifts are produced in the output waveform due to the influences of residual magnetization of the iron reinforcing rods, steel frames, and the like of bridges, tunnels, and the like, positional drifts between the tire and sensor due to vibrations of the vehicle, the influences of residual magnetization of vehicles traveling in the opposite lane, and the like. It is not easy to calculate the revolution speed from the sensor output waveform suffering such drifts.

Figure 7:
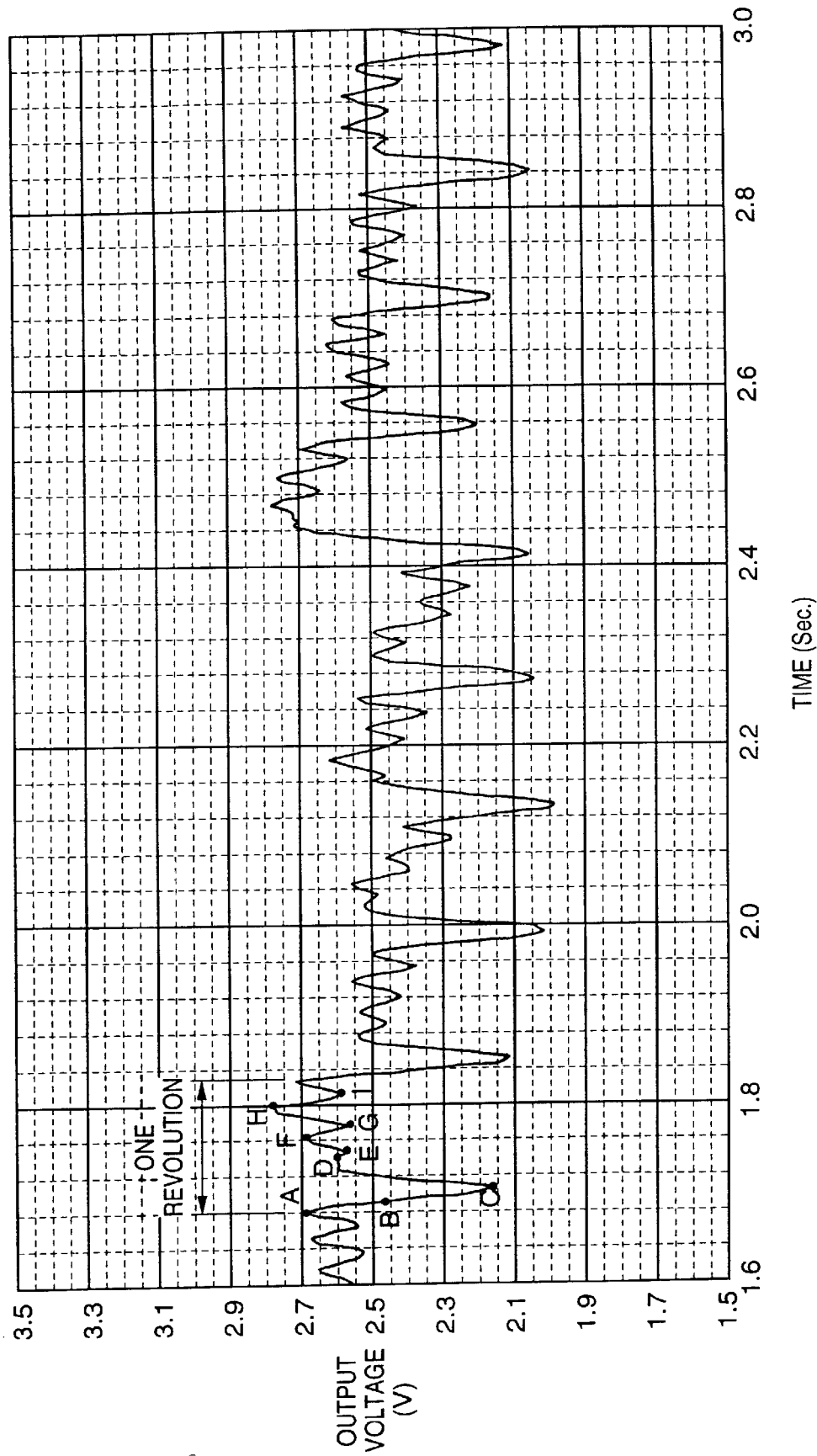
FIG. 7 is a waveform chart of the operation output showing the measurement result of changes in magnetic field upon revolution of the tire when a vehicle travels in a bridge.

FIG. 7 shows, as an example, continuous data obtained by measuring changes in magnetic field upon revolution of the tire when the vehicle travels on a certain bridge at about 50 km/h. This data forms a waveform having a single large peak indicated by a point C per revolution of the tire, and if this peak can be reliably detected, the revolution speed can be accurately detected, and the speed and traveled distance can be calculated.

However, as can seen from the whole waveform, the waveform swells, and how to deal with this swell is the question. This swell is the influence of the iron reinforcing rod or steel frame of the bridge, and a magnetic disturbance due to the residual magnetization of such structure produces the swell on the output waveform. Although the sensor performs differential operations to eliminate the influences of the disturbance, the influences of the disturbance cannot be removed completely.

Since this swell is formed by frequency components lower than those forming the output waveform upon revolution of the tire, a method of removing the swell by a high-pass filter, and counting zero-crossing points or crossing points at a certain threshold values has been examined. However, since the vehicle speed is required to fall within the range from the speed equal to or lower than the walking speed of a human being to about 200 km/h in high-speed performance,. the frequency band from nearly DC to about 200 Hz must be taken into consideration, and a plurality of filters must be prepared. In addition, the S/N ratio drops due to decreases in output obtained via the filter at a constant speed.

In view of these problems, the present invention adopts the following method. That is, the output waveform is sequentially converted into numerical data, and a peak of the output waveform is detected by checking using a microcomputer if changes (increment or decrement) in data have been inverted. Whether or not the potential difference between that peak and the immediately preceding peak exceeds a predetermined threshold value is checked to determine if that peak is an effective peak suitable for detecting the tire revolution. By counting the effective peaks, the revolution speed of the tire is calculated, and the traveled distance or speed is calculated based on the diameter of the tire and the ratio of the circumference of a circle to its diameter.

According to this embodiment, the influences of disturbances as relatively low frequency components in the output waveform can be nearly completely removed, and tire revolution can be detected independently of the speed.

A tire revolution detection apparatus for detecting the tire revolution by the above-mentioned tire revolution detection method will be explained below with reference to FIG. 8.

Figure 8:
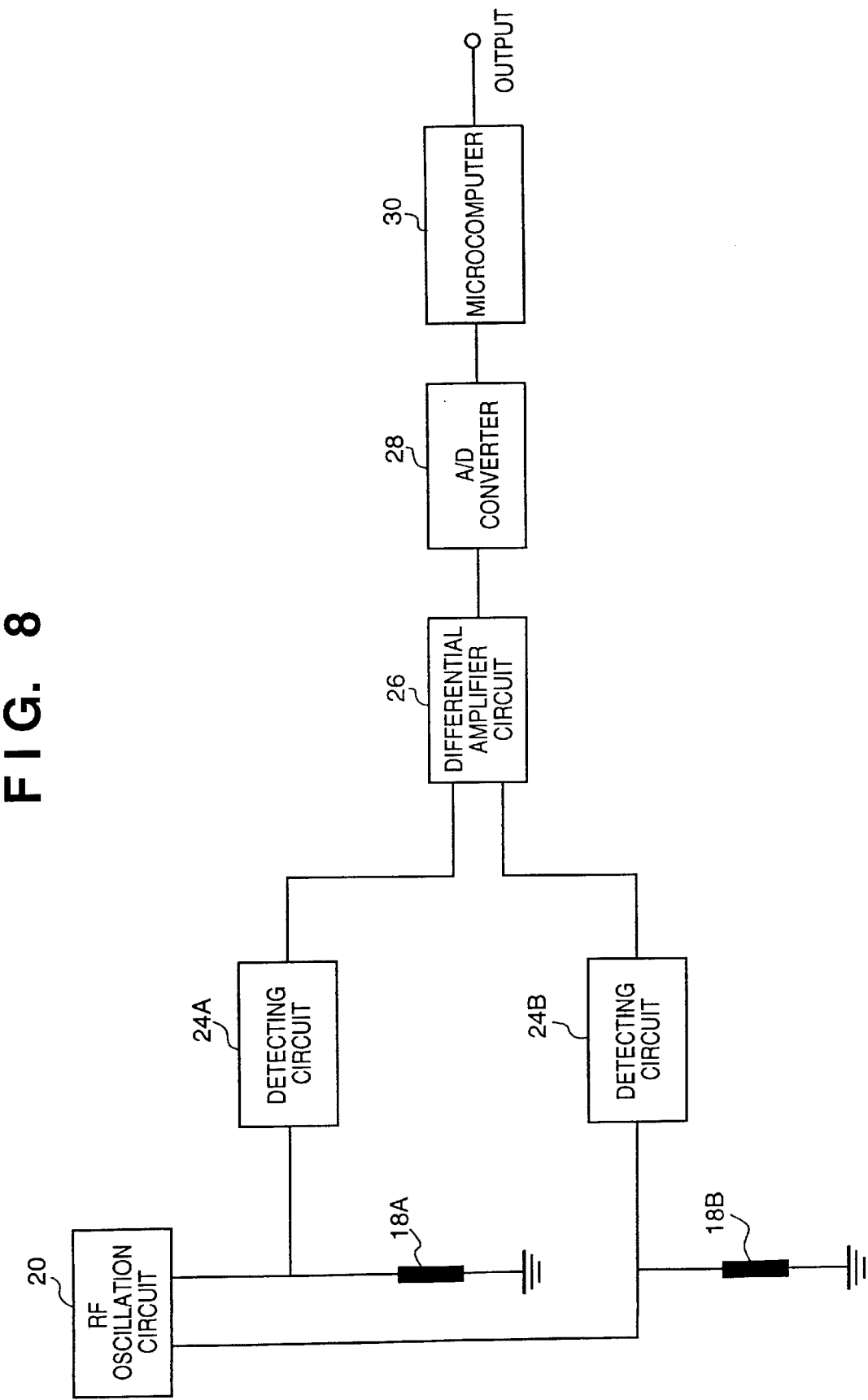
FIG. 8 is a block diagram showing the overall circuit arrangement of a tire revolution detection apparatus according to an embodiment of the present invention.

In the circuit arrangement shown in FIG. 8, an arrangement from the MI elements 18A and 18B to the a differential amplifier circuit 26, i.e., the arrangement of the magnetic detection circuit shown in FIG. 2, may be replaced by the magnetic sensor 14, or the arrangement of the overall apparatus shown in FIG. 8 may be replaced by the magnetic sensor 14.

In the circuit arrangement shown in FIG. 8, as described above, RF currents output from the RF oscillation circuit 20 are applied to the MI elements 18A and 18B, and signals representing changes in voltage across the two terminals each of the MI elements 18A and 18B are supplied to the detecting circuits 24A and 24B to remove high-frequency components to output magnetic detection signals. These detection signals are input to the differential amplifier circuit 26 and are differentially amplified. Thereafter, the differential output is converted from an analog signal into a digital signal (to be referred to as A/D-conversion hereinafter) by an analog-to-digital (A/D) converter 28. The digital signal is input to a microcomputer 30, and the microcomputer 30 performs the above-mentioned peak detection and effective peak determination on the basis of the digital signal.

The processing of the microcomputer will be described in detail below with reference to the flow chart in FIG. 9 and the differential output signal waveform chart in FIG. 7.

Figure 9:
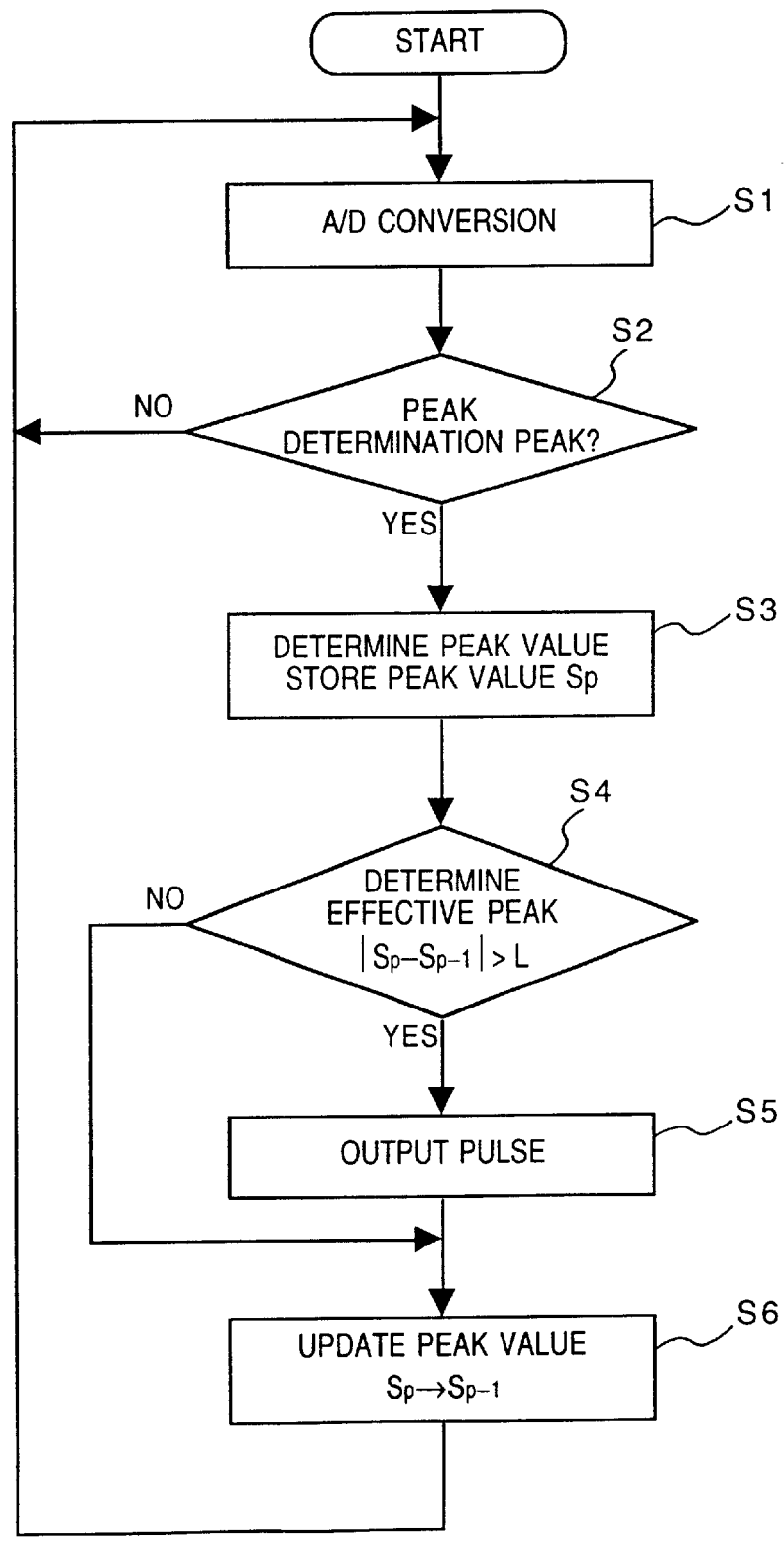
FIG. 9 is a flow chart showing the signal processing procedure by a microcomputer 30 in FIG. 8.

In the processing shown in the flow chart in FIG. 9, the differential output voltage from the sensor is A/D-converted by the A/D converter 28 in step S1, and the digital signal is input to the microcomputer 30.

It is checked in step S2 if the data input in step S1 corresponds to a peak. This checking step is attained by determining whether or not the change direction of the latest data from the second latest data is reversed from positive (increment) to negative (decrement) or vice versa with respect to the change direction of the second latest data from the third latest data. If N (NO) in step S2, the flow returns to step S1; otherwise, the flow advances to step S3.

For example, it is determined that a point B in the differential output waveform shown in FIG. 7 is not a peak, since the change direction remains negative (decrement), and the flow returns to step S1 to A/D-convert the next data. Thereafter, when data at a point C is converted into numerical data, reversal of the change direction from negative to positive is detected, and it is determined that the data at the point C is a peak. Then, the flow advances to step S3.

In step S3, for example, the data at the point C, which is determined to be a peak, is stored as a peak value Sp in, e.g., the internal RAM or the like of the microcomputer 30.

In step S4, whether or not the,absolute value of the difference between the current peak value Sp and the previous peak value Sp-1 exceeds a predetermined threshold value L is checked to determine if the data of the peak value Sp is an effective peak effective for tire revolution detection. The relationship between the peak values Sp and Sp-1 in, e.g., FIG. 7 is that if Sp is the point C, Sp-1 is the point A; if Sp is the point D, Sp-1 is the point C.

The threshold value L is set,to remove very small peaks since they have a low S/N ratio and are weak against disturbances, and to pick up relatively large peaks so as to assure high reliability. Needless to say, if a small threshold value L is set, small peaks can be detected; if a large threshold value L is set, large peaks alone are detected. Hence, the threshold value L can be set in correspondence with the output waveform that changes depending on the magnetization state of the steel belt of the tire and the setting position of the sensor. The threshold value L is preferably set to fall within the range from 10% to 90% of the maximum interpeak (two consecutive peaks) potential difference since variations in the output waveform itself are about 10% with reference to the maximum interpeak potential difference measured in advance.

In the example shown in FIG. 7, in the entire waveform, the maximum interpeak potential difference is about 0.5 V. In this case, if the threshold value L is set at 0.3 V (60% of 0.5 V) to determine an effective peak, the difference between the peak C and the immediately preceding peak A is about 0.55 V and exceeds 0.3 V of the threshold value L, and it is determined that the peak C is an effective peak. However, in the case of a peak E, since the difference from the immediately preceding peak D is about 0.02 V and does not exceed the threshold value L, the peak E is ignored. Hence, within the range corresponding to one revolution of the tire indicated by the arrow in FIG. 7, two peaks C and D are:determined to be effective peaks.

Referring back to FIG. 9, if an effective. peak is determined in step S4, the output pin of the microcomputer 30 outputs a pulse signal with a small pulsewidth in step S5. This pulse is output to inform the car navigation apparatus main body of the detection of an effective peak. As another output pattern of the pulse signal, a pulse signal may be inverted every time an effective peak is determined.

The flow then advances from step S5 to step S6. On the other hand, if it is determined in step S4 that the data of interest is not an effective peak, the flow also advances to step S6. In step S6, the current peak value Sp is stored in the RAM as the previous peak value Sp-1 to update the peak value Sp-1. Thereafter, the flow returns to A/D conversion in step S1 to repeat the above-mentioned processing.

Since the peak detection and effective peak determination in the above-mentioned processing do not include any time parameters, tire revolution detection can be made independently of the revolution speed of the tire. Hence, a predetermined detection performance can be assured even when the vehicle speed changes from a very low speed to a high speed.

In the above processing, the number of pulses output in step S5, i.e., the number of detected effective peaks. may be counted, and the revolution speed of the tire may be calculated based on the count value. Furthermore, the distance the vehicle traveled may be calculated by multiplying the calculated revolution speed by the diameter of the tire and the ratio of the circumference of a circle to its diameter. In this case, since one pulse does not always correspond to one revolution of the tire, the number of pulses corresponding to one revolution must be examined in advance. In addition, since the number of pulses corresponding to one revolution corresponds to an integer multiple, a method of performing correction of a fraction of an integer by comparing with distance measurement data obtained by a GPS unit in the car navigation apparatus is also effective.

According to the above-mentioned embodiment, the problems of the present invention can be solved. That is, the magnetic sensor 14 has a very high sensitivity since it uses MI. elements, and is free from changes in state due to magnetization unlike in a flux gate sensor. Also, since the magnetic sensor 14 is set in the vicinity of the rear tire in the cabin or trunk room of the vehicle, it can be easily set and can satisfactorily detect the magnetic field from the tire. Since the above-mentioned differential detection, and the peak detection and effective peak determination by the microcomputer 30 are performed, the influences of disturbance magnetic fields can be eliminated, and the revolution or revolution speed of the tire can be accurately detected.

In this embodiment, the MI elements are used as the magnetic detection elements. However, any other magnetic detection elements may be used as long as they have high sensitivity.

Finally, the measurement results of the traveled distance after a 2,000 cc passenger vehicle with the revolution detection apparatus of this embodiment traveled 10 km in an urban area will be described below.

In the test, since the vehicle travels in the urban area, it repeats stop-and-go, and its speed changes considerably. Note that the diameter of each tire of the test vehicle is 60 cm, and the vehicle travels 1.88 m per revolution of the tire. The measurement result indicated 21,982 as the number of pulses output from the above-mentioned arrangement shown in FIG. 8, and since two pulses were output per revolution, the traveled distance was measured to be 9.782 km. Measurement errors are about 2.2%; therefore, the precision required for the self-contained navigation of the car navigation apparatus can be assured even in an urban area where the vehicle speed changes and the vehicle suffers many disturbance magnetic fields.

[Tire Magnetization Method and Tire Magnetic Field Detection Method]

The above-mentioned basic embodiment is described on the premises that the tire, the revolution or revolution speed of which is to be detected, is in the state wherein its steel belt is naturally magnetized, i.e., magnetization is not artificially controlled.

Figure 10:
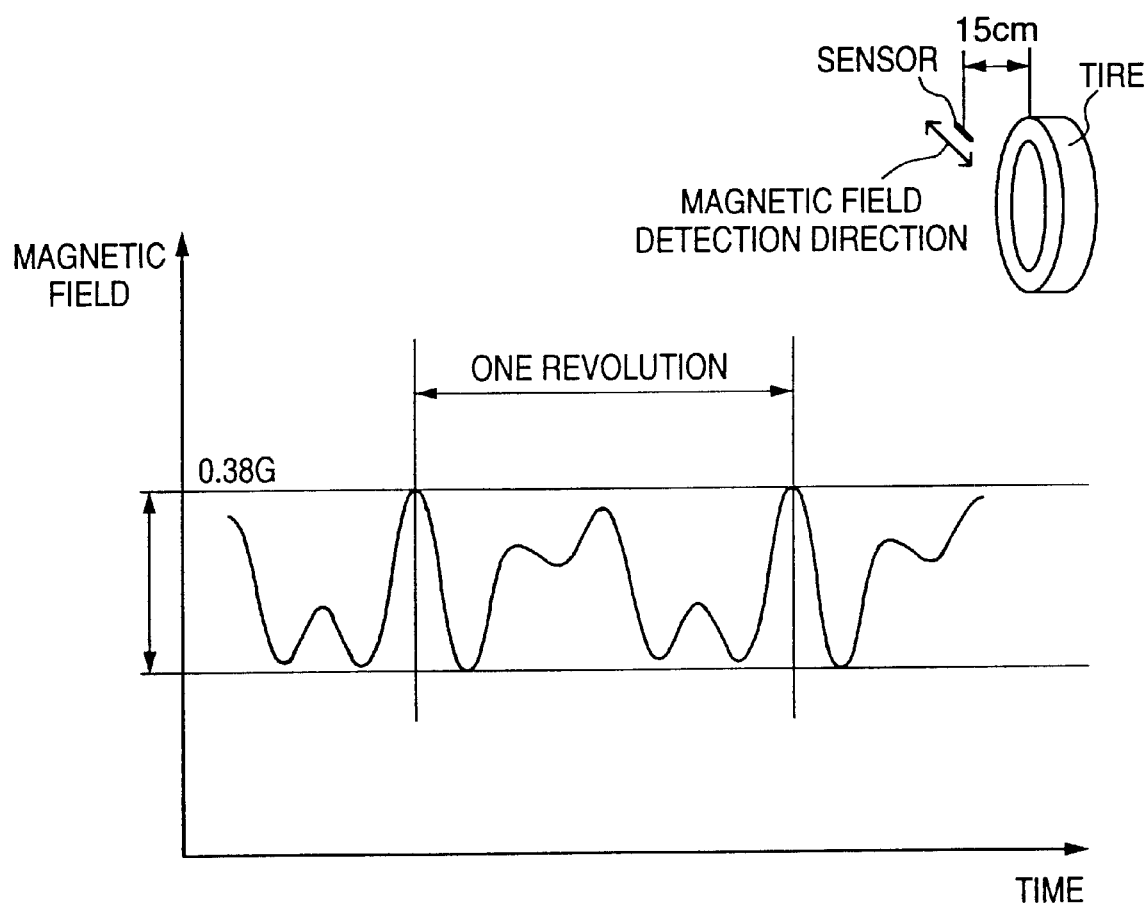
FIG. 10 is a waveform chart showing the measurement result of changes in magnetic field upon revolution of a tire.

In this case, as described above with the aid of FIG. 10, the magnetic field change pattern upon revolution of the tire includes a plurality of peaks per revolution of the tire.

However, if the magnetic field pattern includes a plurality of peaks per revolution of the tire, correction of a fraction of an integer must be done upon calculating the revolution speed of the tire by counting the number of peaks as in the calculation of the tire revolution speed in the above-mentioned basic embodiment, and since the individual tires have different numbers of peaks, correction values must be set in units of tires.

In view. of these problems, if a signal corresponding one pulse per revolution of the tire can be obtained by controlling the magnetized state of the tire, magnetic detection of the tire revolution is facilitated. Embodiments of a tire magnetization method suitable for magnetic revolution detection of a tire in consideration of these problems and embodiments of a magnetic field detection method that can obtain a stable output waveform from a tire magnetized by that magnetization method will be explained hereinafter with reference to FIGS. 11 to 21.

[Magnetization Method of First Embodiment]

The first embodiment of a tire magnetization method will be explained below.

Figure 11:
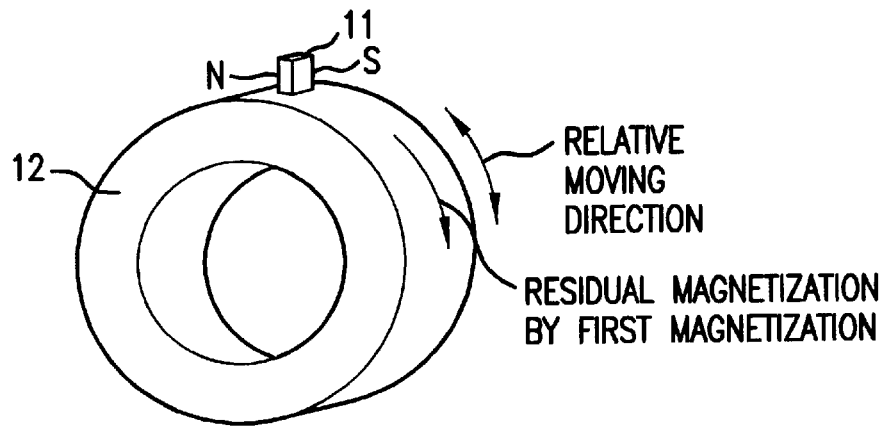
FIG. 11 is a perspective view for explaining the first magnetization process in a tire magnetization method according to the first embodiment of the present invention.

In the magnetization method of the first embodiment, in the first magnetization process, as shown in FIG. 11, the entire perimeter of the outer circumferential portion of a tire 12 which has a steel belt inside its outer circumferential portion is continuously magnetized in one direction agreeing with its circumferential direction.

For this purpose, a magnetization magnet 11 is brought into contact with or close to the outer circumferential surface of the tire 12, and is moved relative to the tire more than 360° for one revolution along the circumferential direction of the tire, as shown in FIG. 11. More specifically, the magnet 11 itself is moved by one revolution or more along the outer circumferential surface of the tire 12, or the magnet 11 is fixed in position and the tire 12 is revolved by one revolution or more. As shown in the enlarged view of FIG. 12, the magnet 11 is set, so that its N and S poles face each other in the circumferential direction of the tire 12, i.e., the relative moving direction, and a magnet field Hw generated by the magnet 11 is applied to the steel belt, generally shown as dotted line SB, below the outer circumferential direction of the tire 12.

Figure 12:
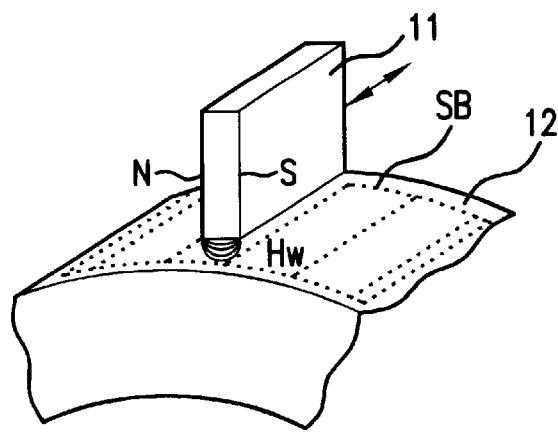
FIG. 12 is an enlarged view of principal part in FIG. 11.

Note that the outer circumferential surface of the tire 12 is preferably magnetized across its width. For this purpose, when the width of the magnet 11, which is set, as shown in FIGS. 11 and 12, is smaller than the width of the outer circumferential surface of the tire 12, the magnet 11 is moved relative to the tire along the widthwise direction of the outer circumferential surface of the tire 12 (the axial direction of the tire), and is also moved relative to the tire by two revolutions or more along the circumferential direction of the tire 12, thereby magnetizing the outer circumferential surface of the tire 12 across its width. Note that the outer circumferential surface of the tire 12 need not always be magnetized across its width. In this case, a portion, which is about ⅔ of the width, and is close to a magnetic sensor (to be described later) on the outer circumferential surface of the tire, may be magnetized.

As the relative moving direction of the magnet 11 and the tire 12, one direction agreeing with the circumferential direction of the tire 12 may be used or two directions agreeing with the circumferential direction may be used to reciprocally move them in two directions.

When the tire is magnetized while it is attached to a vehicle, the tire to be magnetized is jacked up, the magnetization magnet is brought into contact with the outer circumferential surface of the tire, and the tire is manually revolved. Alternatively, without using any jack, a portion, other than the grounded portion, of the outer circumferential surface of the tire is rubbed with the magnet to magnetize that portion, and after the vehicle is slightly moved, the remaining portion is rubbed to magnetize it, thus easily magnetizing the tire.

In this manner, the entire perimeter of the outer circumferential portion of the tire is continuously magnetized in one direction agreeing with its circumferential direction in the first magnetization process, thereby re-magnetizing and resetting residual magnetization that the tire initially had.

Note that a method of perfectly demagnetizing initial residual magnetization by applying an AC attenuation magnetic field to the tire is also available. However, this method is not suitable since the perfectly demagnetized steel belt portion is readily magnetized, and noise due to random magnetization by external magnetic fields may pose some problems.

Figure 13:
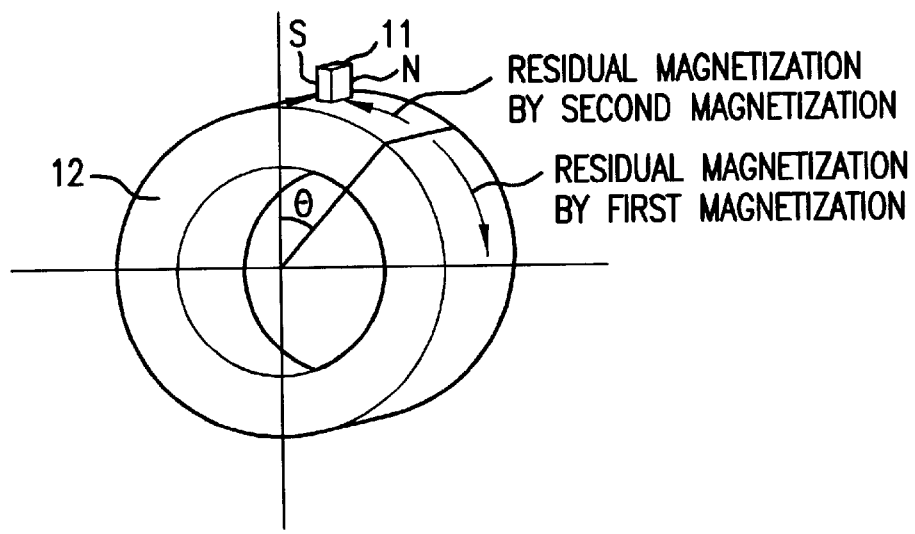
FIG. 13 is a perspective view for explaining the second magnetization process in the tire magnetization method according to the first embodiment of the present invention.

In the. second magnetization process, as shown in FIG. 13, after the polarity of the magnetization magnet 11 is inverted with respect to the circumferential direction of the tire 12, the magnetization magnet 11 is brought into contact with or close to the outer circumferential surface of the tire 12, and is moved relative to the tire along the circumferential direction of the tire 12, thus continuously re-magnetizing a range of a predetermined angle θ smaller than 360° on the outer circumferential portion of the tire 12 in a direction opposite to the magnetization direction in the first magnetization process. In this manner, the magnetized portion used for magnetically detecting the revolution of the tire 12 is formed, and a magnetic field that can be easily detected by a magnetic sensor can be generated.

Figure 14:
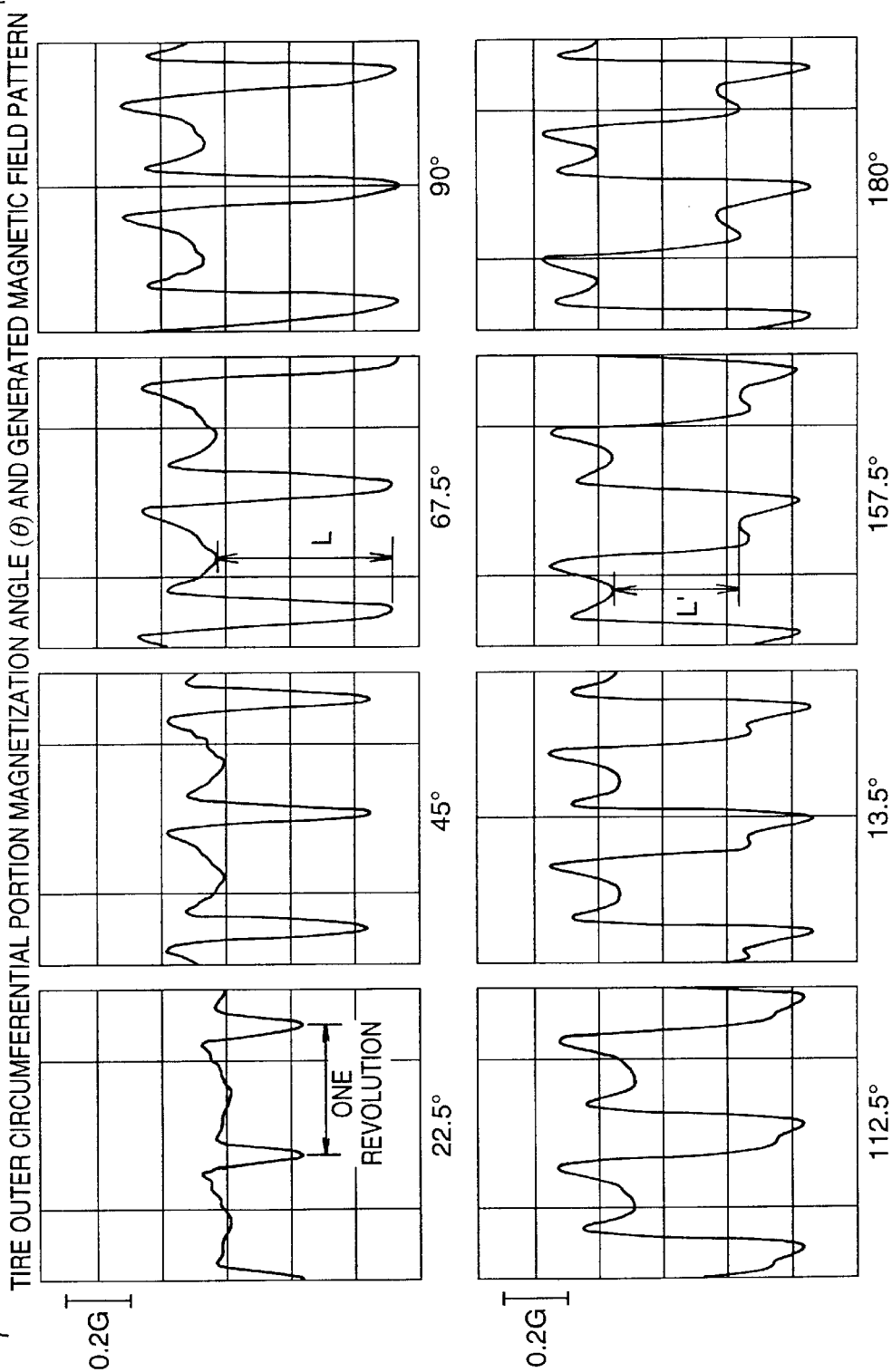
FIG. 14 is a waveform chart showing the magnetic field patterns generated by a tire in correspondence with different magnetization angles θ in the second magnetization process.

Note that the angle θ in the second magnetization process has influences on the pattern or magnitude of a magnetic field generated, and has an optimal angle. The examination results of an optimal value will be explained below. In the examination, the angle θ in the second magnetization process was changed in 22.5° increments, magnetic fields along the circumferential direction at a position 20 cm from the outer circumferential surface of the tire were measured by rotating tires magnetized at the individual angles, and the patterns of the measured magnetic fields were examined. The magnetization magnet used had an interval of 2 mm between its N and S poles, and produced a magnetization magnetic field Hw of about 200 G at a position 10 mm from the magnetization surface of the magnet. FIG. 14 shows the examination results. The abscissa of data plots time. The data varies since the tire revolution upon measurements is not constant, but one revolution can be recognized based on the periodic pattern.

As can be seen from the magnetic field patterns, when the angle θ is equal to or smaller than 90°, the patterns have downward sharp peaks, and changes in magnetic field are maximum when θ=90°. Of course, if the polarity of magnetization is inverted, upward sharp peaks appear. Furthermore, when the angle θ exceeds 90°, indents are formed at sharp peaks, and become deeper as the angle increases.

In order to detect the revolution of the tire by detecting the magnetic field generated by the tire, a predetermined threshold value is set. In consideration of level variations of the magnetic field pattern from the tire due to external magnetic fields, a broad setting range of the threshold value must be assured. The determination width as the range suitable for setting that threshold value is L between the downward sharp peak and the bottom of an upper indent (see the chart of 67.5°) when the magnetization angle θ is equal to or smaller than about 90°, or the determination width is L' between upper and lower indents (see the chart of 157.5°) when the magnetization angle exceeds 90° and indents are formed at downward sharp peaks.

Figure 15:
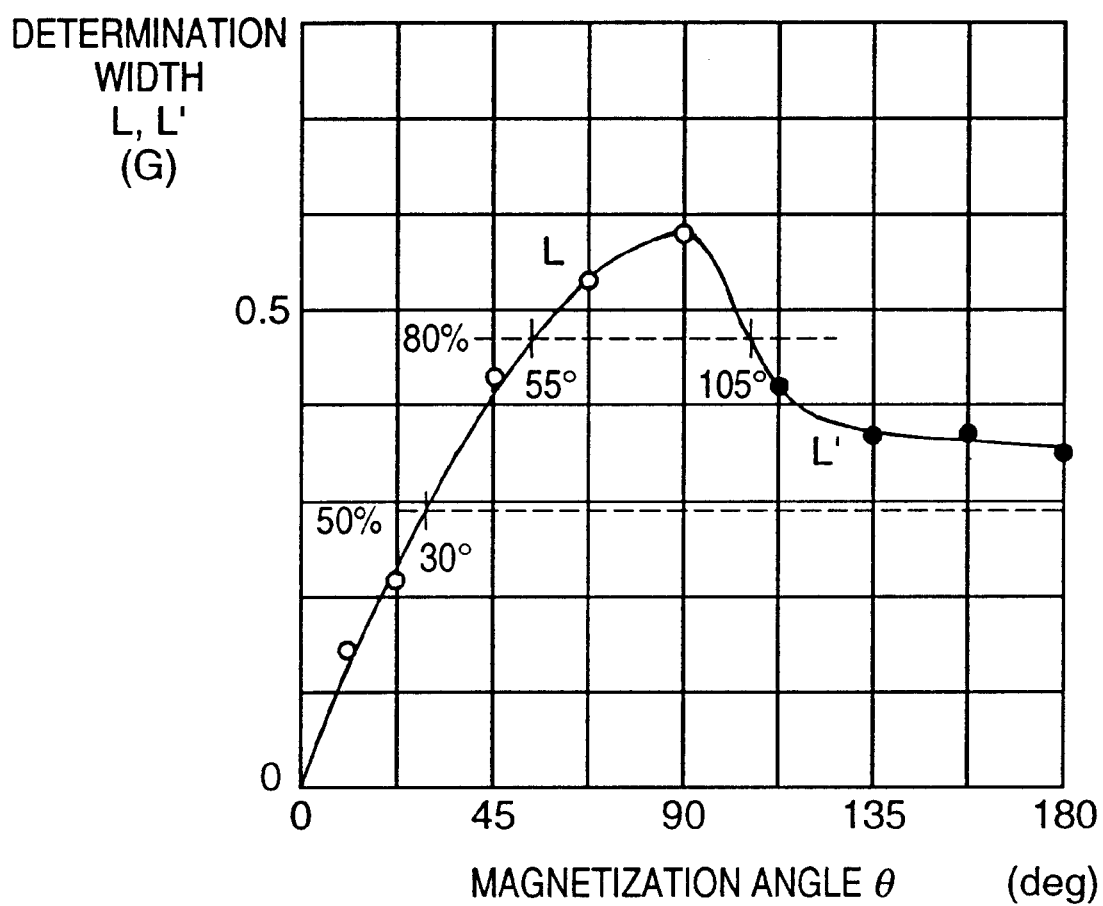
FIG. 15 is a graph showing determination widths L and L' used for setting the revolution detection threshold value of the magnetic field detection output in correspondence with the magnetization angle θ.

The graph of these determination widths L and L' is as shown in FIG. 15. As can be seen from this graph, the optimal magnetization angle is 90°. Upon examination of a practical range, in a region with a small magnetization angle θ, the magnetic field generated by the tire is small, and the influences of external magnetic fields become relatively larger. For this reason, if the practical range is determined to be 50% of the maximum determination width, the magnetization angle θ ranging from 30° to 180° is suitably used. Furthermore, when the optimal range is determined to be 80% of the maximum determination width, the angle θ falls within the range from 55° to 105°, and a stabler magnetic field can be obtained.

Note that the angle range up to 180° has been described above. When the angle θ in the second magnetization process exceeds 180°, symmetric patterns are formed although their polarities are inverted, and the same applies to the angle of 360° (of residual magnetization in the first magnetization process)−θ. That is, the above-mentioned optimal magnetization angle range can be determined for a smaller one of the angles of the residual magnetization portions in opposite directions on the outer circumferential portion of the tire magnetized in the first and second magnetization processes.

[Tire Magnetization Method of Second Embodiment]

The tire magnetization method of the first embodiment described above is directed to supply of one pulse signal to a car navigation apparatus main body per revolution of the tire. When two pulses are output per revolution of the tire, since the unit of one pulse corresponds to a ½ revolution of the tire, errors due to output pulse errors caused by external magnetic fields that act as disturbances or vibrations, shock, or the like of the tire can be reduced. For example, in the case of a tire having a diameter of 60 cm, the measurement precision of the distance traveled per pulse can be improved from 1.88 m to 0.94 m. When the car navigation apparatus main body calculates the traveled distance based on speed calculations, for example, when the speed calculations are done. based on the number of pulses per sec, errors become large when the number of pulses per revolution is small, especially when the vehicle travels at a low speed. However, in this embodiment, the precision can be improved in terms of such errors.

As the tire magnetization method of the second embodiment, a tire magnetization method that can stably generate two pulse signals per revolution of the tire will be explained below.

In the tire magnetization method of the second embodiment, the first and second magnetization processes in the tire magnetization method of the first embodiment described above are sequentially performed. Note that the angle range to be re-magnetized in the second magnetization process is set at 90°. Unlike in the above description, a non-magnetized portion may be left in the first magnetization process without magnetizing the entire perimeter of the outer circumferential surface of the tire, and the non-magnetized portion may be magnetized in the second magnetization process. In this case, the angle range to be magnetized in the first magnetization process is larger than 270° and smaller than 360°, and the 90° range including the non-magnetized portion is magnetized in the second magnetization process.

The above-mentioned first and second magnetization processes are described in more detail with the tire magnetization method of third embodiment.

Finally, the third magnetization process is done. In this process, a 90° range, which is on the opposite side about the center of the tire, i.e., is revolved 180° from the 90° ranged magnetized in the second magnetization process, on the outer circumferential portion of the tire, i.e., a 90° range which is point-symmetrical to the 90° range magnetized in the second magnetization process, is continuously re-magnetized in-the same direction as that in the second magnetization process along the circumferential direction, i.e., in a direction opposite to the magnetization direction in the first magnetization process, by the same method as in the second magnetization process. Magnetization is complete with the third magnetization process.

Also, the non-magnetized portion forming method in the first magnetization process has an advantage that the magnetized process performed by switching between the second magnetization process and the third magnetization can be completed with one revolution of the tire. This reason is clear from the following action. Namely, after the non-magnetized portion is formed, the portion which is point-symmetrical to the non-magnetized portion is magnetized again in an opposite direction from the first magnetization process. After that, the non-magnetized portion is magnetized by revolving the tire.

Figure 16:
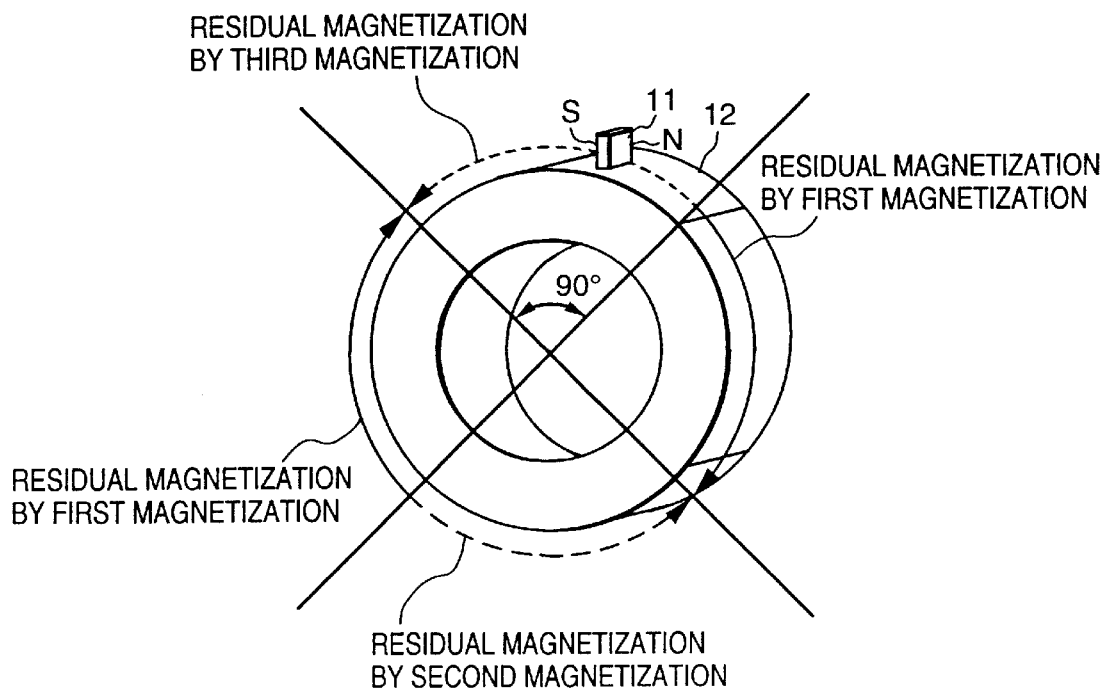
FIG. 16 is a perspective view showing the magnetized state of a tire by a tire magnetization method according to the second embodiment of the present invention.

FIG. 16 shows the magnetized state of the tire magnetized by such magnetization method. As shown in FIG. 16 that shows the residual magnetization ranges and directions formed by the first to third magnetization processes, according to the second tire magnetization method, a magnetized state wherein the entire perimeter of the outer circumferential portion of a tire 12 is divided into four 90° ranges, which are magnetized to alternately have opposite magnetization directions along the circumferential direction of the tire, is formed.

Figure 17A:
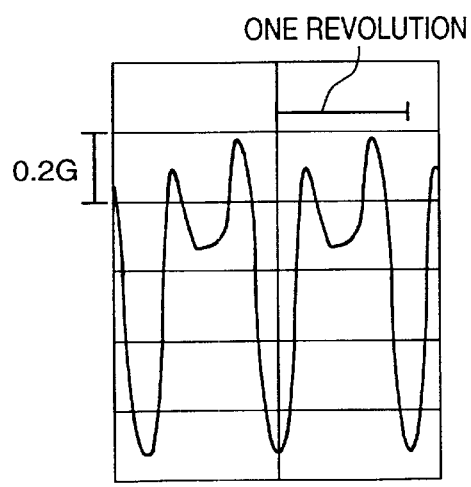
FIG. 17A is a waveform chart showing the magnetic field pattern of a tire upon completion of the second magnetization process in the tire magnetization method of the second embodiment.
Figure 17B:
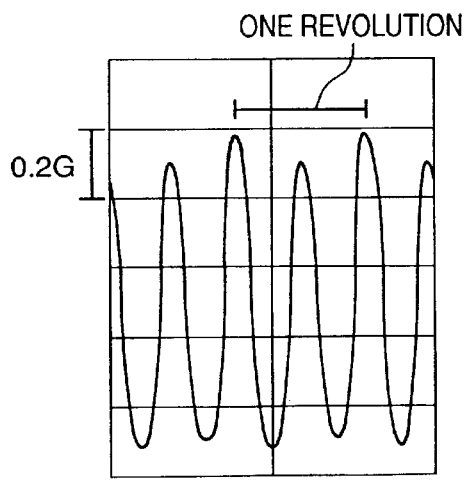
FIG. 17B is a waveform chart showing the magnetic field pattern of a tire upon completion of the third magnetization process in the tire magnetization method of the second embodiment.

FIGS. 17A and 17B show the measurement results of a magnetic field along the circumferential direction on the outer circumferential surface of the tire magnetized by the tire magnetization method of the second. embodiment,. i.e., respectively show the magnetic field pattern of the tire upon completion of the second magnetization process, and the magnetic field pattern of the tire upon completion of the third magnetization process.

The magnetic field pattern upon completion of the third magnetization process is defined by a waveform having two peaks per revolution of the tire although the peaks have slightly different heights. As can be seen from FIGS. 17A and 17B, the magnitude of changes in magnetic field remains roughly the same as that upon completion of the second magnetization process, and a good magnetized state can be formed.

As described above, in magnetic revolution detection of a tire magnetized by the tire magnetization method of the second embodiment, two pulse signals can be stably generated per revolution of the tire. Hence, errors in traveled distance measurements of a vehicle by detecting the revolution of the tire can be reduced, and the precision of the self-contained navigation of a car navigation apparatus can be improved.

When a magnetic field is detected so as to detect the revolution of the tire magnetized by the tire magnetization method of the second embodiment, the layout of two magnetic detection elements in the above-mentioned embodiment of the tire magnetic field detection method is most suitably used, and the detection method of that embodiment can be directly applied.

In the tire magnetization methods of the first and second embodiments described above, the tire is magnetized. using a magnetic field along the. circumferential direction of the tire. However, when a magnetic sensor is set in practice, its magnetic field detection. direction does not always agree with the circumferential direction, and some apprehensions are entertained as to whether optimal conditions for magnetization using the magnetic field in the circumferential direction are maintained, since, for example, the magnetic field direction may change depending on the detection positions due to arcuated magnetization patterns. However, as a result of actual examinations, optimal conditions for magnetization in view of the, magnetic field in the circumferential direction can also be applied even to those actually used. The contents of the examinations will be explained below.

Figure 18A:
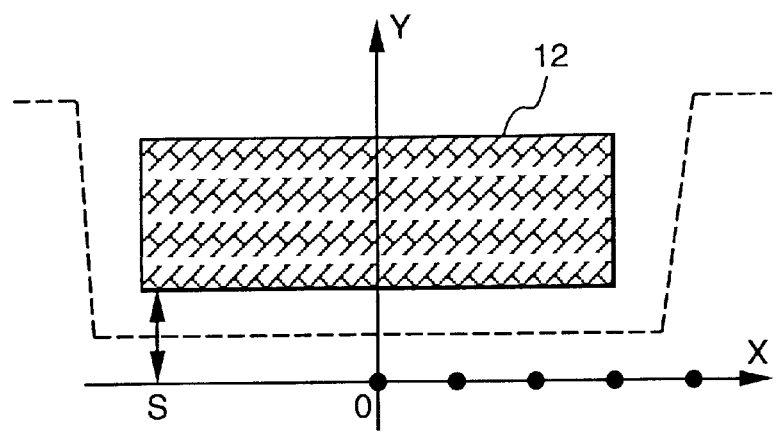
FIG. 18A is a top view showing the positions of magnetic field measurement points for a tire.
Figure 18B:
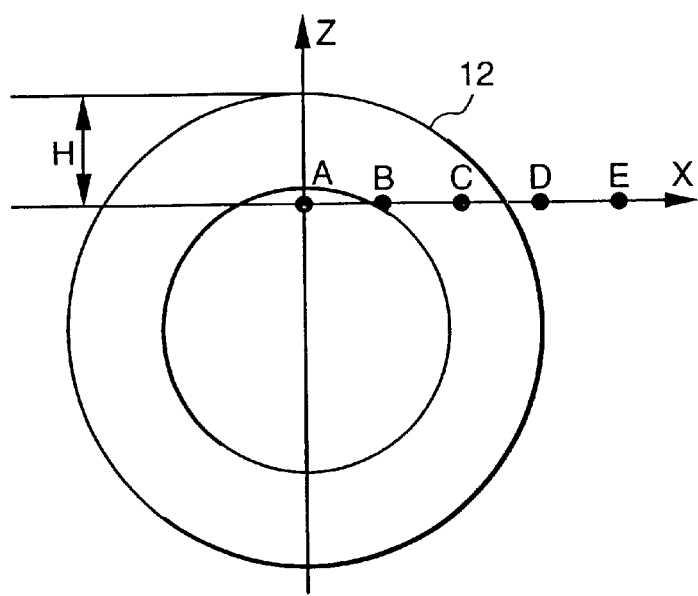
FIG. 18B is a side view of FIG. 18A.

When the magnetic field from the tire is detected by the magnetic sensor, the sensor is suitably set in the trunk room on the back side of the tire, and if its position is expressed by coordinates, the sensor is set on an X-Y plane shown in FIGS. 18A and 18B.

In the examinations, a tire having a diameter of 60 cm was used, a height H from the X-Y plane to the top of the tire was set at 10 cm, and a distance S between an X-Z plane and the side surface of the tire was set at 15 cm. The tire was magnetized by the above-mentioned method, and a smaller magnetization angle range θ of the residual magnetization portions in two directions on the tire outer circumferential portion by the first and second magnetization processes was set at 90°. The magnetic field detection direction agrees with the Z-axis direction, and changes in magnetic field upon revolution of the tire were measured at points A, B, C, D, and E at 10-cm intervals on the X-axis in FIGS. 18A and 18B.

Figure 19:
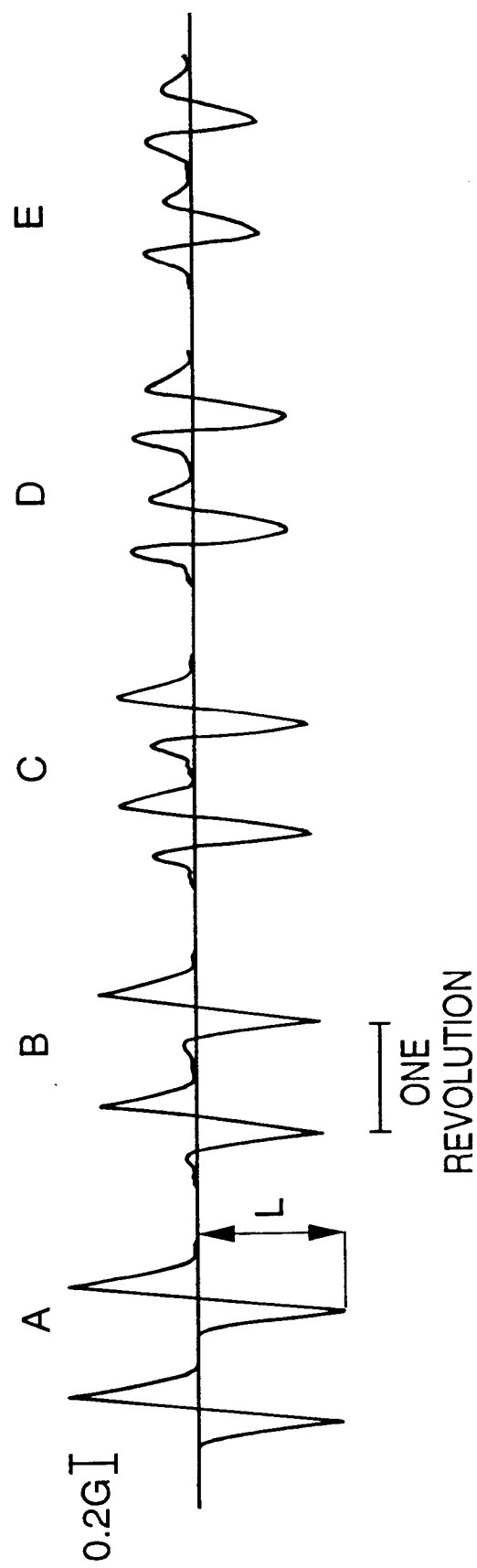
FIG. 19 is a waveform chart showing changes in magnetic field at the individual measurement points shown in FIGS. 18A and 18B upon revolution of the tire.

FIG. 19 shows the measurement results. As compared to data at the angle θ=90° described above in FIG. 14, a waveform whose phase is rotated 90° and is obtained as if it were differentiated is formed at point A. As the measurement point becomes closer to outer point D close to the outer circumferential portion of the tire, the waveform resembles the magnetic field in the circumferential direction. As can be seen from the above description, the phase changes depending on the angle the magnetization direction on the outer circumferential portion of the tire closest to the measurement point makes with the Z-axis direction as the magnetic field detection direction.

From points A to E, the phase has changed in the waveforms, but a lower peak stably appears once per revolution, and the determination width L between that peak and a peak above it is stably obtained. This fact demonstrates that optimal conditions for magnetization in view of the magnetic field in the circumferential direction are maintained.

Hence, the method of magnetizing the tire in view of a magnetic field along the circumferential direction of the tire is effective for every setting position and magnetic field detection direction of an actual sensor.

As described above, the tire magnetization method for generating an optimal magnetic field for revolution detection of a tire that has a steel belt in its outer circumferential portion is established, and an optimal magnetization angle range can be set.

[Tire Magnetization Method of Third Embodiment]

In the tire magnetization methods of the first and second embodiments described above, the entire perimeter of the outer circumferential portion of the tire is continuously magnetized in one direction along the circumferential direction in the first magnetization process, and a predetermined angle range smaller than 360° on the outer circumferential portion of the tire is continuously re-magnetized in a direction opposite to the one direction in the second magnetization process. In contrast to this, in the tire magnetization method of the third embodiment, the layout of the magnetization magnet, the direction of the magnetic field to be generated, relative movement, and the way of inversion of the polarities of the magnet, and the like are the same as those in the above embodiments, a predetermined angle range smaller 360° on the outer circumferential portion of the tire is continuously magnetized in one direction along the circumferential direction in the first magnetization process, and a non-magnetized portion on the outer circumferential portion of the tire, which remains non-magnetized after the first magnetization process, may be continuously magnetized in a direction opposite to the one direction. However, since it is not easy to accurately magnetize the non-magnetized portion alone, portions neighboring the non-magnetized portion can be magnetized together. In the second magnetization process as well, the angle range from 30° to 180°, and especially, an optimal angle range from 55° to 105°, of a smaller one of the residual magnetization portions in two direction, can be applied.

According to the tire magnetization method of the third embodiment, magnetization can be done without jacking up the tire.

[Tire Magnetic Field Detection Method of First Embodiment]

A tire magnetic field detection method for detecting the magnetic field of the tire magnetized by the tire magnetization method of each of the above embodiments will be explained below. In particular, the optimal layout of magnetic detection elements upon detection of the magnetic field of the tire using a magnetic sensor will be explained.

As an element for detecting the magnetic field from the tire, any one of a flux gate sensor, MI element, Hall element, and the like may be used as long as it has practical sensitivity of about several mG. Since a detection means is influenced by external magnetic fields, e.g., magnetic fields from vehicles that travel on neighboring lanes, and magnetic fields from iron reinforcing rods, steel frames, and the like near a road, only the magnetic field from the tire is detected by differentially operating two magnetic detection elements. However, in this differential detection, if the two magnetic detection elements are set improperly, the phase changes considerably upon detection of the magnetic field from the tire and it becomes hard to set the threshold value, resulting in an apparatus that is not easy to handle.

In view of this problem, this embodiment defines the positional relationship between the two magnetic detection elements that differentially detect the magnetic field from the tire.

The conditions required for the layout of the elements are:
(1) a single, positive or negative large, sharp peak is obtained per revolution of the tire in the detection output;
(2) a broad determination width L for setting the threshold value in the detection output is assured; and
(3) conditions (1) and (2) do not considerably vary depending on the setting position of a magnetic sensor built by the two magnetic detection elements. Conditions (1) and (2) are directed to maintaining optimal conditions of the magnetized state of the tire, and condition (3) is directed to simplifying the setting process without requiring too high a precision in the setting position of the magnetic sensor.

An optimal layout for the two magnetic detection elements was obtained by the following examinations.

In the examinations of layout of the two magnetic detection elements that make differential detection, a magnetic sensor was placed at measurement points A, B, C, and D in the coordinate positional relationship described in FIGS. 18A and 18B, the interval between the two magnetic detection elements used in that sensor was set at 3 cm, and the layout of elements juxtaposed in the X-axis direction was compared to the layout of elements juxtaposed in the Y-axis direction. The magnetic detection elements used in the examinations used MI elements, and had magnetic field detection sensitivity in the Z-direction, i.e., a direction parallel to the side surface of the tire 12.

Figure 20:
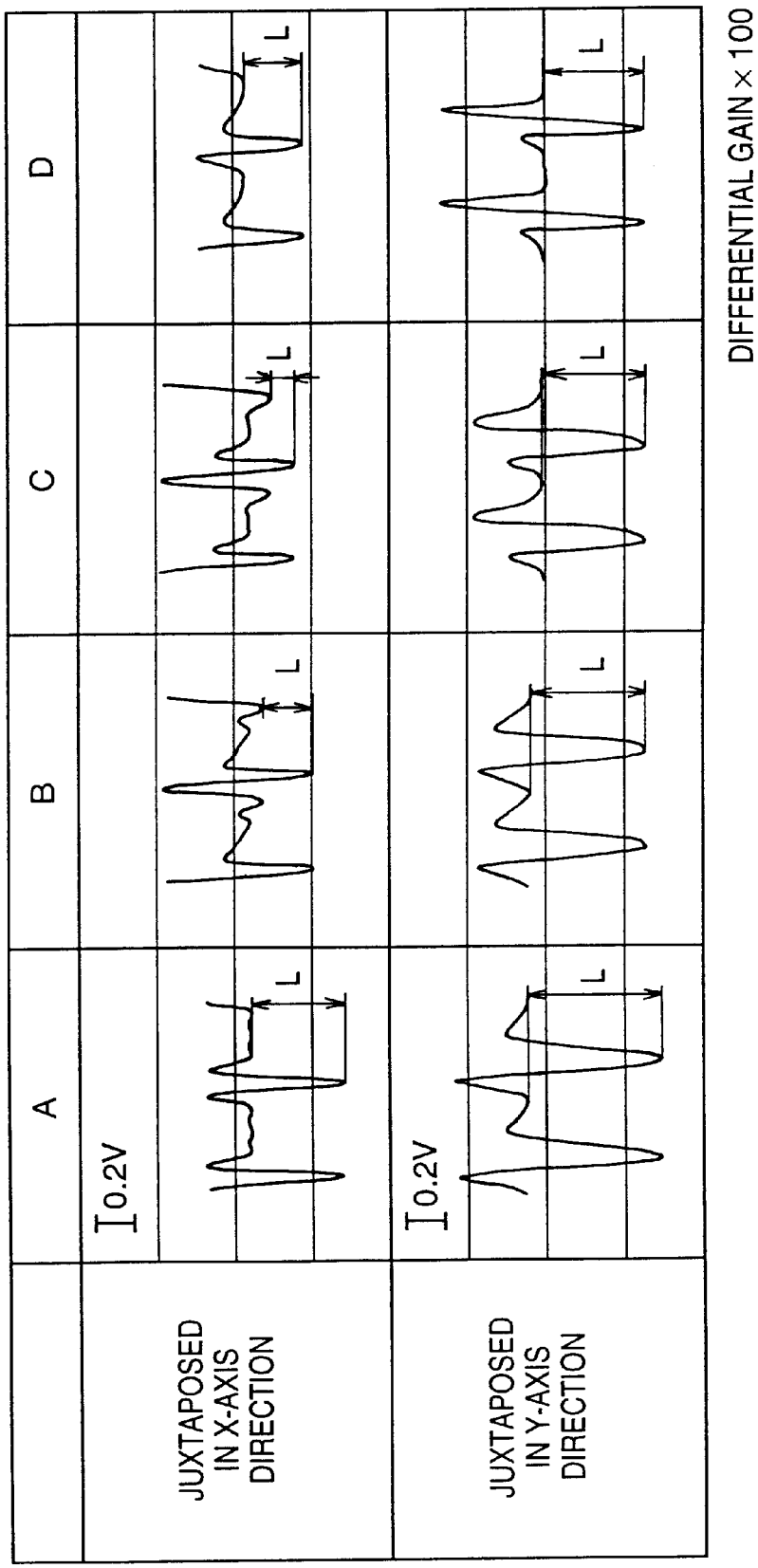
FIG. 20 is a view for explaining a tire magnetic field detection method according to the first embodiment of the present invention, and is a waveform chart showing the relationship between the layout of elements and the detection output waveforms upon differentially detecting a magnetic field by two magnetic detection elements.

FIG. 20 shows the examination results. When the elements are juxtaposed in the X-axis direction, the phases of the detection output waveforms at points A to D change considerably and, hence, the waveforms change. As a result, a constant determination width L for setting the threshold value cannot be obtained, and adjustment is required depending on the setting position of the magnetic sensor. For this reason, such layout is not practical.

On the contrary, when the elements are juxtaposed in the Y-axis direction, i.e., in a direction parallel to a direction perpendicular to the side surface of the tire, the lower peaks of the detection output waveforms at the individual measurement points are stabilized, and the influences of changes in phase appear as only changes in magnitude of neighboring peaks. Hence, a determination width L for setting a threshold value is stable. This fact indicates that the optimal conditions for magnetization by the magnetic field along the circumferential direction are maintained, no fine adjustment of the threshold value depending on the setting position of the magnetic sensor is required, and an apparatus which is very easy to handle can be obtained.

Figure 21:
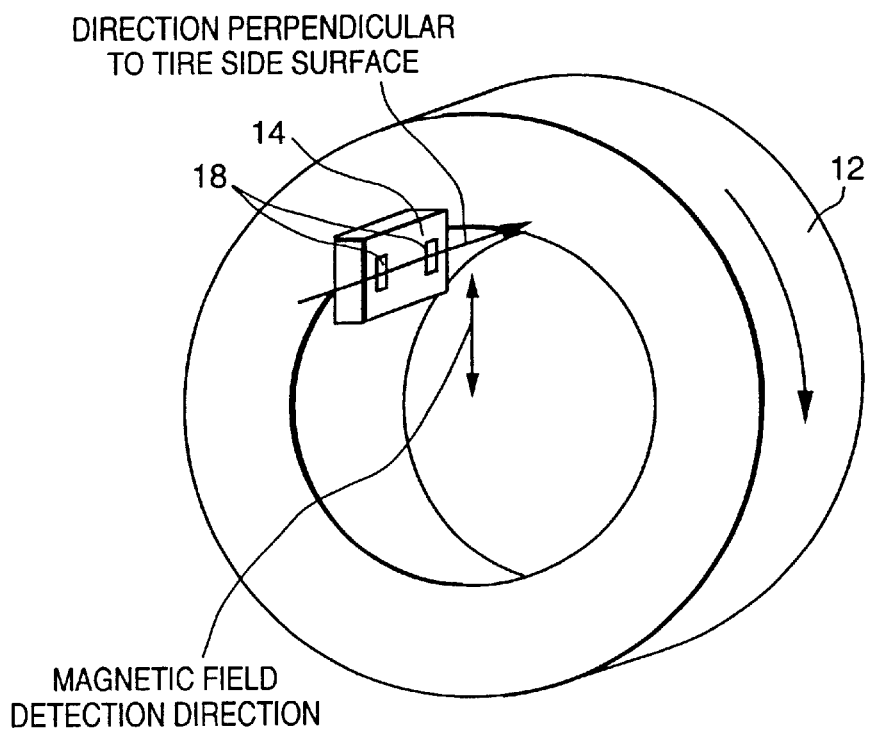
FIG. 21 is a perspective view showing the layout of the two magnetic detection elements determined by the tire magnetic field detection method of the first embodiment.

Accordingly, as can be seen from the perspective view of FIG. 21, when a tire 12 magnetized by the magnetization method of one of the above embodiments is used, and the magnetic field radiated outside the tire 12 is differentially detected by two magnetic detection elements 18 of a magnetic sensor 14, the magnetic field detection direction of the two magnetic detection elements 18 is set to be parallel to the side surface of the tire 12, and the two magnetic detection elements 18 are juxtaposed in a direction perpendicular to the side surface of the tire 12, so that the magnetic sensor 14 can be set easily, and a broad determination width for setting the threshold value in the detection output waveform can be stably obtained.

[Tire Revolution Detection Apparatus of Second Embodiment] and [Tire Revolution-Detection Signal Processing Method]

Figure 22:
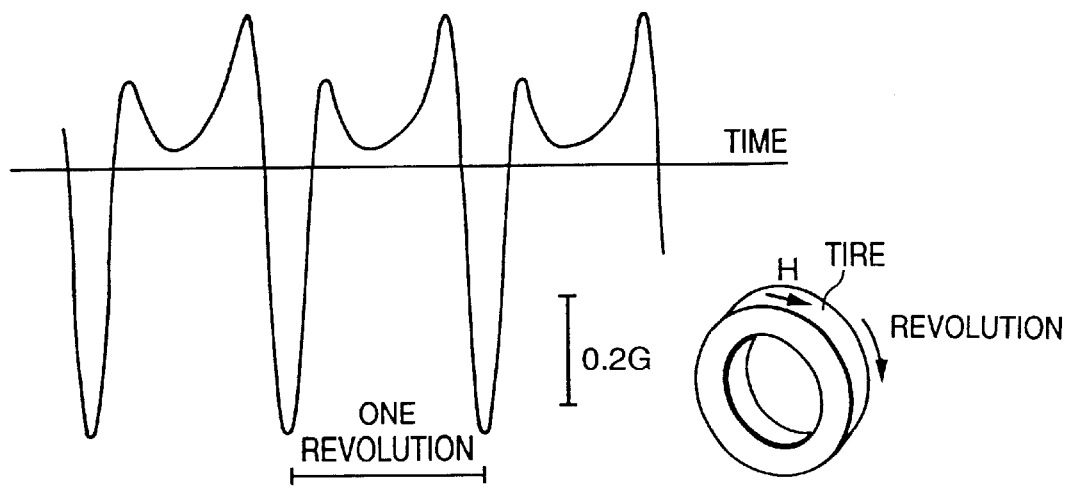
FIG. 22 is a waveform chart showing a magnetic field pattern upon revolution of a tire magnetized at a magnetization angle of 90° by the tire magnetization method of the first embodiment.

In the tire magnetization method of each of the above embodiments, for example, when the magnetization angle θ in FIG. 13 is set at 90° as one of the optimal conditions, a magnetic field pattern in which the magnetic field changes largely and which has a single large peak per revolution when viewed from the magnetic field along the circumferential direction of the tire is obtained, as shown in FIG. 22. However, when this magnetic field is detected from the trunk room or cabin side of a vehicle by the above-mentioned magnetic sensor to obtain the revolution detection output of the tire, the following problems must be solved to realize highly reliable detection.

(1) Level drifts due to disturbances must be absorbed.

Figure 23:
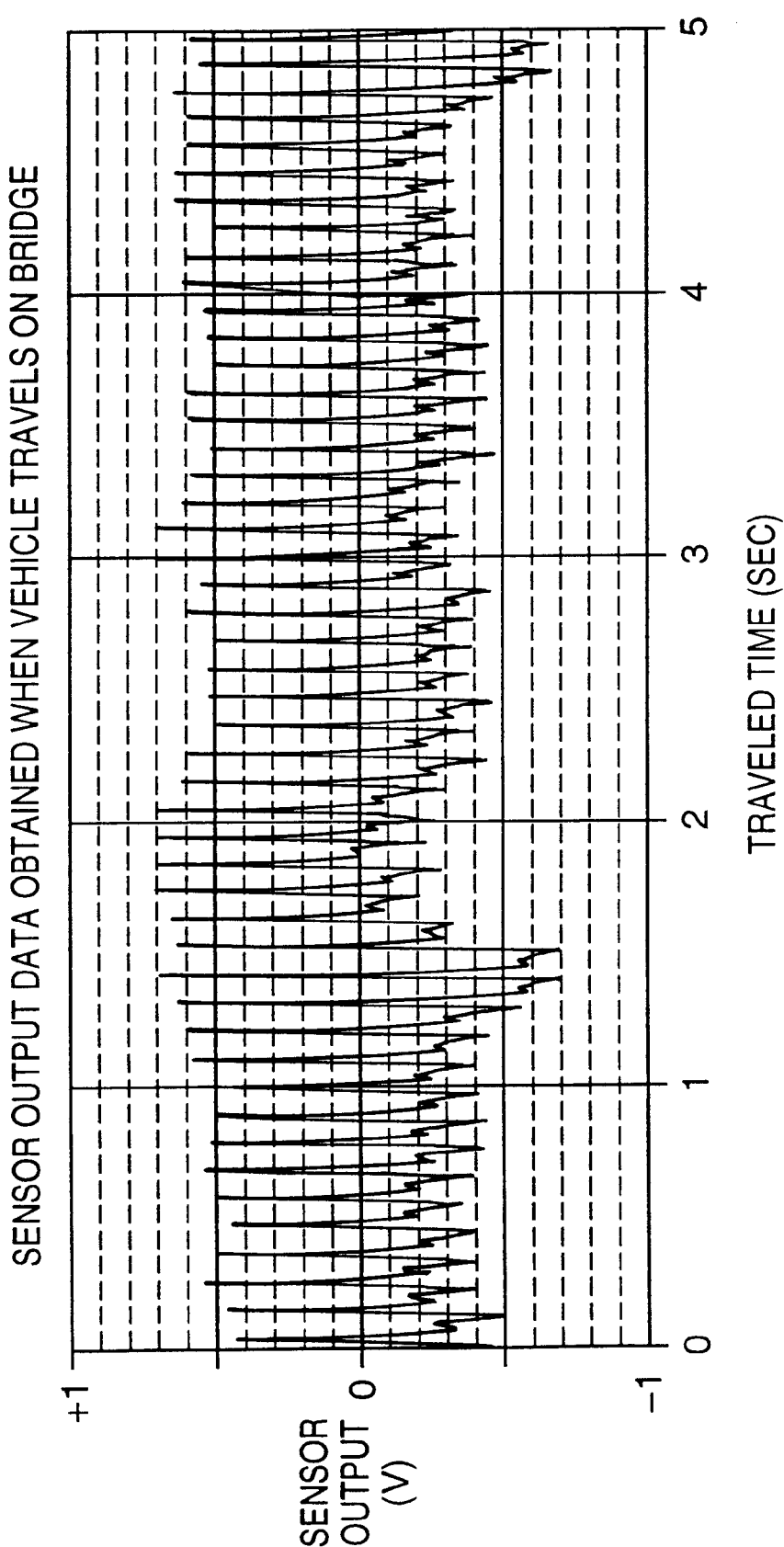
FIG. 23 is a graph showing the actually measured data of the tire revolution detection sensor output when a vehicle travels on a bridge.

Since the magnetic field from the tire is as small as 1 G or less at. the detection position, external magnetic fields during travel of a vehicle, e.g., the influences of residual magnetization of iron reinforcing rods, iron plates, steel frames, and the like act as disturbances, thus causing level drifts in the sensor output. FIG. 23 shows the sensor output of the tire revolution when a vehicle travels on a bridge at 65 km/h. As can be seen from FIG. 23, level drifts have occurred under the influences of iron reinforcing rods at places. This data shows that disturbances cannot be sufficiently removed although the magnetic detection elements comprise MI elements and are differentially operated at the interval of 3 cm.

(2) variations in sensor output must be absorbed.

The magnitude of the sensor output varies by a factor of about several times under the influences of different distances between the tire and sensor in units of vehicle types, different magnetization levels due to different types and sizes of tires, and-the like. As a consequence, if the threshold value for revolution detection is set at a fixed value, it becomes hard for the user to handle the apparatus.

(3) Processing must be robust against waveform distortions of the sensor output.

Figure 24:
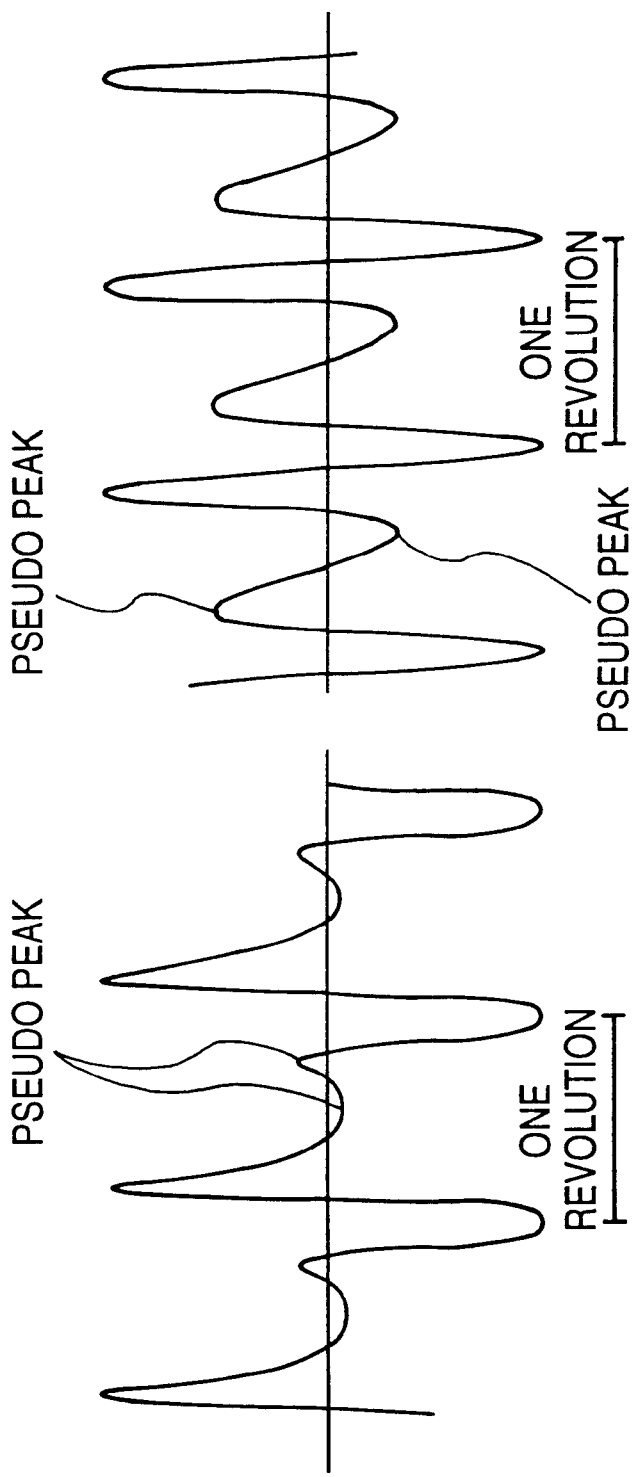
FIGS. 24A and 24B are waveform charts showing waveform distortions including pseudo peaks of the tire revolution detection sensor outputs.

Furthermore, since the positional relationship between the sensor and tire varies depending on the types of vehicles, when the magnetic field from the tire is differentially detected, the phase of the magnetic field pattern from the tire shown in FIG. 21 is likely to change, and in some case, waveform distortions such as pseudo peaks shown in FIGS. 24A and 24B, are produced.

The above-mentioned basic embodiment considers problem (1),.but does not consider problems (2) and (3). Hence, the second embodiment of a tire revolution detection apparatus and a tire revolution detection signal processing method that. take these problems into consideration will be described below with reference to FIGS. 25 to 27.

Figure 25:
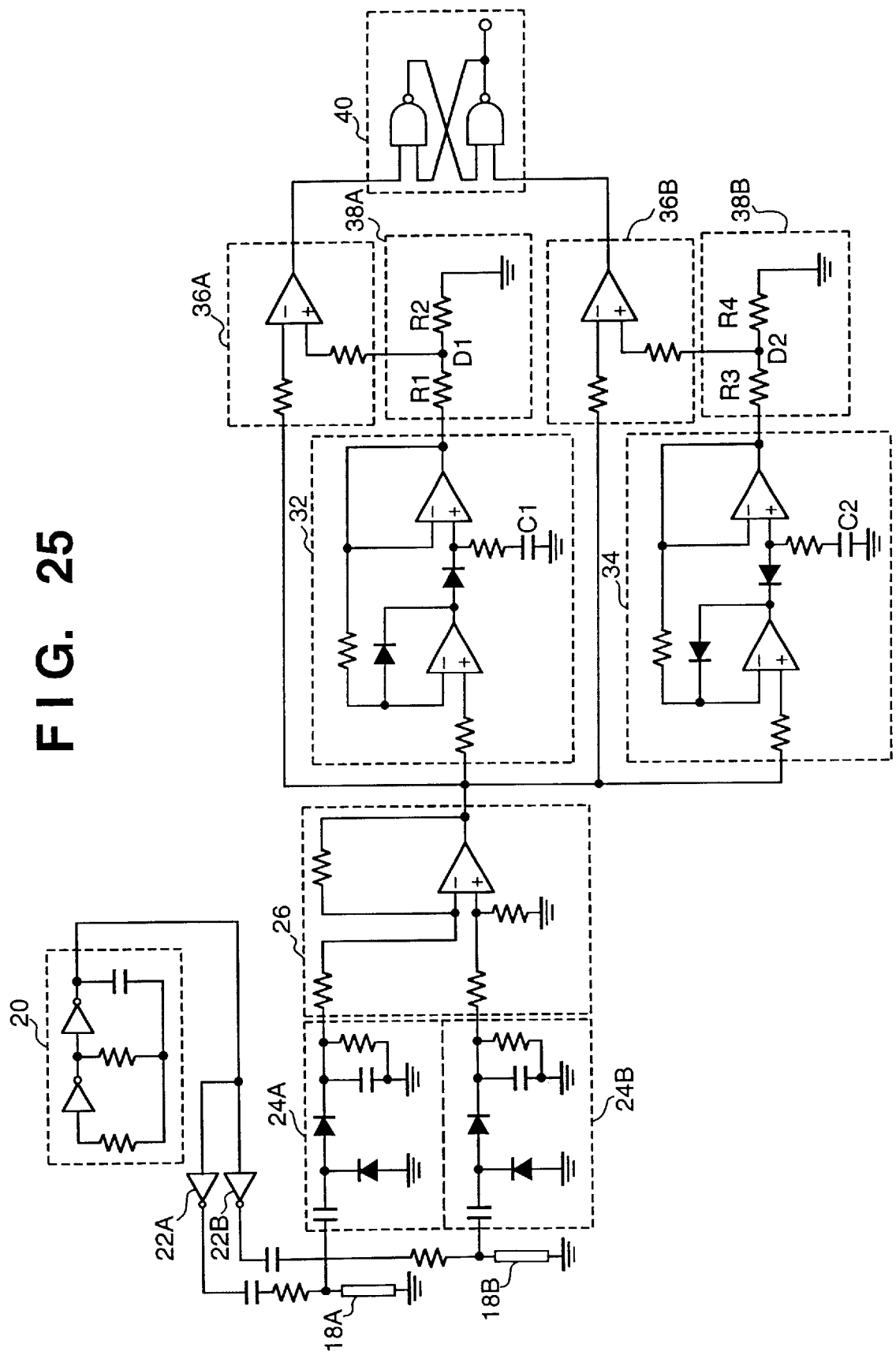
FIG. 25 is a circuit diagram showing the arrangement of a magnetic detection circuit of a magnetic sensor according to the second embodiment.

FIG. 25 is a circuit diagram for obtaining the tire revolution detection output from the magnetic sensor in the tire revolution detection apparatus of the second embodiment. Referring to FIG. 25, a section consisting of MI elements 18A and 18B, an RF oscillation circuit 20, buffers 22A and 22B, detecting circuits 24A and 24B, and a differential amplifier circuit 26 is the same as the circuit arrangement of the above-mentioned basic embodiment shown in FIG. 2, and corresponds to a circuit that builds the above-mentioned magnetic sensor 14. In this circuit, as in the above description, the RF oscillation circuit 20 applies RF currents to the MI elements 18A and 18B via the buffers 22A and 22B. The impedances of the MI elements 18A and 18B change in correspondence with changes in magnetic field from the tire, and the voltage across the two ends of each element changes. The voltage signals are detected by the corresponding detecting circuits 24A and 24B to be extracted as magnetic detection signals of the MI elements 18A and 18B. These magnetic detection signals are input to the differential amplifier circuit 26 and are differentially amplified, thus obtaining a sensor output. As the sensor output, a signal having the waveform shown in, e.g., FIG. 23 or FIG. 24A or 24B is obtained.

Figure 26:
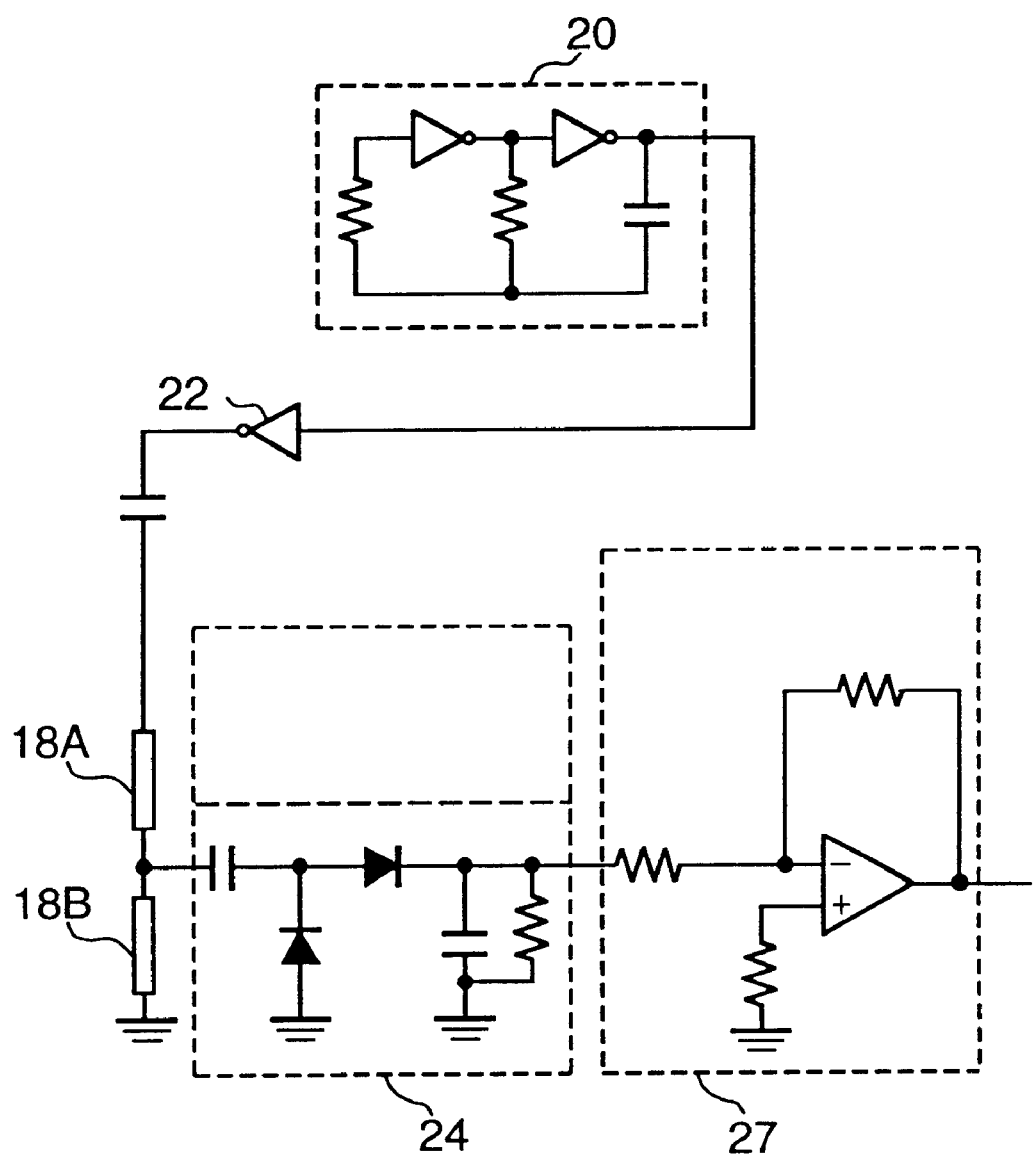
FIG. 26 is a circuit diagram showing a modification of the circuit diagram shown in FIG. 25.

As a modification of the circuit for the magnetic sensor, as shown in FIG. 26, the MI elements 18A and 18B may be connected in series with each other, and the RF oscillation circuit 20 may apply an RF current to the series circuit of these elements via a buffer 22. A signal at the node between the MI elements 18A and 18B may be detected and extracted by a detecting circuit 24, and the extracted signal may be amplified by an inverting amplifier 27 to obtain a sensor output. The magnetic detection element is not limited to the MI element, and other elements such as a flux gate sensor, Hall element, MR element, and the like may be used. In this case, the arrangement of a driving circuit for driving the magnetic detection elements on the input side of the differential amplifier circuit 26 in FIG. 25 or the inverting amplifier 27 in FIG. 26 differs depending on the types of magnetic detection elements used.

Referring back to FIG. 25, the arrangement on the output side of the differential amplifier circuit 26 is as follows unlike the arrangement of the basic embodiment shown in FIG. 8.

The differentially amplified output from the differential amplifier circuit 26, i.e., the sensor output signal is input to a maximum hold circuit 32 and a minimum hold circuit 34. These circuits 32 and 34 are peak hold circuits each of which is constituted by two operational amplifiers, diodes, resistors, and a capacitor C1 or C2, and which respectively hold the voltage levels of a plus peak (maximum value) and a minus peak (minimum value) of the sensor output waveform. These maximum and minimum hold circuits are used as means for automatically variably setting the threshold value in correspondence with the output level of the magnetic sensor even when the output level varies, as will be described later. Note that the holding duration of the hold voltage is determined by the capacitance of the capacitor C1 or C2 for holding the voltage. However, in consideration of level drifts in the sensor outputs, attenuation should be allowed to some extent in place of excessively improving the holding characteristics.

The outputs from the maximum and minimum hold circuits 32 and 34 are applied to voltage dividers 38A and 38B each consisting of a series circuit of two resistors, thus setting, as threshold values, voltages D1 (plus side) and D2 (minus side) each obtained by dividing the voltage between the hold voltage and zero potential at a predetermined ratio. These threshold values are input, as comparison voltages, to comparators 36A and 36B, each constituted by an operational amplifier and resistors. The threshold values for the plus and minus sides are set to extract plus and minus peaks. When the voltage division ratios defined by the resistors in the voltage dividers 38A and 38B are appropriately set, level drifts of the waveform can be absorbed. This mechanism will be described in detail later.

The comparators 36A and 36B also receive the sensor outputs from the differential amplifier circuit 26, and convert the sensor output into pulse signals by comparing it with the threshold values D1 and D2. These pulse signals are respectively input to the set and reset inputs of an RS flip-flop circuit 40, thus obtaining a final tire revolution detection output as one pulse per revolution of the tire. The RS flip-flop circuit 40 is used to generate one pulse per revolution by alternately recognizing plus and minus peaks by detecting peaks that exceed the two threshold values D1 and D2. As a consequence, the tire revolution detection signal processing, which is strong against level drifts and waveform distortions of the output, can be realized.

[Tire Revolution Detection Signal Processing Method]

Figure 27:
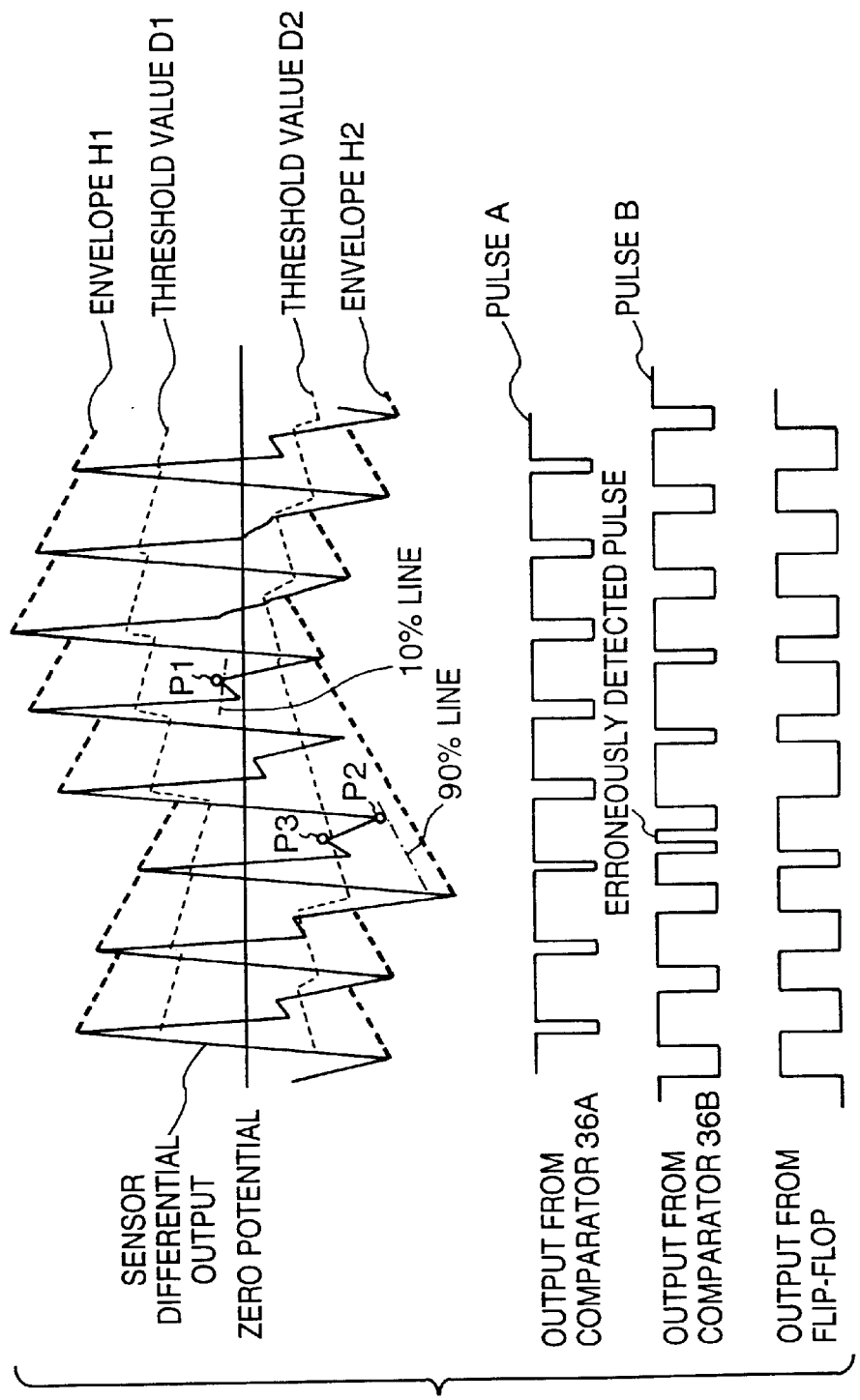
FIG. 27 is a waveform chart showing signal waveforms in the individual circuits to explain the operation of the circuit in FIG. 25.

The circuit operation of the tire revolution detection apparatus of the second embodiment described above will be described in detail below with reference to FIG. 27. FIG. 27 shows the waveform of the actual sensor output (the output from the differential amplifier circuit 26) and the signal waveforms in the individual units obtained by processing that waveform in the above-mentioned circuit.

The upper portion of FIG. 27 shows the periodic waveform of the sensor output. This waveform has level drifts under the influence of magnetic disturbances in its middle section. When this waveform is input to the above-mentioned maximum and minimum hold circuits, the waveforms of an envelope H1 that connects plus peaks and an envelope H2 that connects minus peaks are obtained, as indicated by the broken lines in FIG. 27. The waveforms of the envelopes H1 and H2 are allowed to attenuate after the individual peaks of the sensor output waveform so as to cope with level drifts of the sensor output waveform.

The comparators 36A and 36B obtain pulses as detection results of plus and minus peaks from the sensor output using the waveforms of the envelopes H1 and H2. In order to reliably detect peaks, the voltage dividers 38A and 38B set the potentials of the threshold values D1 and D2 between the zero potential and the hold voltages of the envelopes H1 and H2, and the comparators 36A and 36B compare the sensor output with these potentials to generate pulses.

In FIG. 27, the dotted lines indicate the waveforms of the threshold values D1 and D2 obtained when the voltages between the zero potential and hold voltages are voltage-divided at a ratio of 50% determined by the resistances R2/(R1+R2) and R4/(R3+R4) of the resistors in the voltage dividers 38A and 38B shown in FIG. 25. The voltage division ratio is preferably set at about 50%, and plus and minus peaks can be detected reliably. If the voltage division ratio is too small (e.g., 10%), a pseudo peak near the zero potential is likely to be detected, as indicated by reference numeral P1; if the voltage division ratio is too large (e.g., 90%), detection of an actual peak fails, as indicated by reference numeral P2. For this reason, the voltage division ratio is preferably selected from the range from 10% to 90%.

In the above description, the threshold values D1 and D2 are set by voltage-dividing the hold voltages with reference to zero potential. If the sensor output is defined by AC coupling, zero potential is set when the tire stands still. For this reason, in order to assure a dead zone near the zero potential so as not to detect noise, voltage division is made between a voltage slightly offset from the zero potential toward the hold voltage side, and the hold voltage.

The comparators 36A and 36B obtain outputs like pulses A and B shown in the second and third columns in FIG. 27 by comparing the sensor output and the threshold values D1 and D2. The pulses A correspond to plus peaks of the sensor output, and the pulses B correspond to minus peaks of the sensor outputs. Note that the polarities of the pulses A and B are set so that they change to low level upon detection of peaks, since the RS flip-flop circuit 40 operates based on low-level inputs.

The pulses A and B are input to the RS flip-flop circuit 40, which outputs pulses which fall in response to the trailing edges of the pulses A, and rise in response to the trailing edges of the pulses B (the relationship between rise and fall may be reversed). More specifically, the circuit 40 outputs pulses which fall upon detection of plus peaks of the sensor output waveform, and rise upon detection of minus peaks. In this manner, a revolution detection output as one pulse per revolution of the tire can be finally obtained.

In the pulses B shown in FIG. 27, an erroneously detected pulse corresponding to a pseudo peak P3 in the sensor output shown in the upper portion of FIG. 27 is generated. However, since the pulse A does not fall during the period between that erroneously detected pulse and the immediately preceding pulse, the flip-flop circuit 40 ignores the erroneously detected pulse in the pulses B.

That is, since the flip-flop circuit 40 is used, no tire revolution detection output pulse is generated based on a pseudo peak unless pseudo peaks due to waveform distortions of the sensor output successively exceed the plus and minus threshold values D1 and D2, and the influences of pseudo peaks formed by the waveform distortions of the sensor output can be circumvented. In addition, the above-mentioned case rarely occurs in a magnetic sensor setting environment in a normal vehicle. That is, the signal processing method according to this embodiment is very strong against waveform distortions of the sensor output. Also, according to this embodiment, since the threshold values D1 and D2 used for detecting the peaks of the sensor output waveform can be automatically variably set in correspondence with level drifts and variations of the sensor output by performing maximum and minimum hold processes of the sensor output and voltage-dividing the hold voltages, as described above, the level drifts and variations of the sensor output can be absorbed. As described above, the tire revolution detection signal processing method of this embodiment is very effective, and can realize a highly reliable tire revolution detection apparatus.

[Tire Revolution Detection Apparatus of Third Embodiment]and [Tire Revolution Detection Signal Processing Method of Second Embodiment]

A tire revolution detection apparatus of the third embodiment can further improve the reliability of the apparatus.

In the tire revolution detection apparatuses of the first and second embodiments, since the threshold values are set between the zero potential and hold voltages, when the sensor output drifts largely due to disturbances, for example, when the sensor output does not have any zero-crossing point, each threshold value does not cross the sensor output, and pulse errors are likely to be produced.

In order to avoid such problem, the threshold values must be able to work beyond the zero potential.

As a means for solving this problem, the outputs from the maximum and minimum hold circuits are directly connected via a plurality of resistors to set two voltage division points, and the plus and minus voltage division points are respectively set to be plus and minus threshold values.

Figure 28:
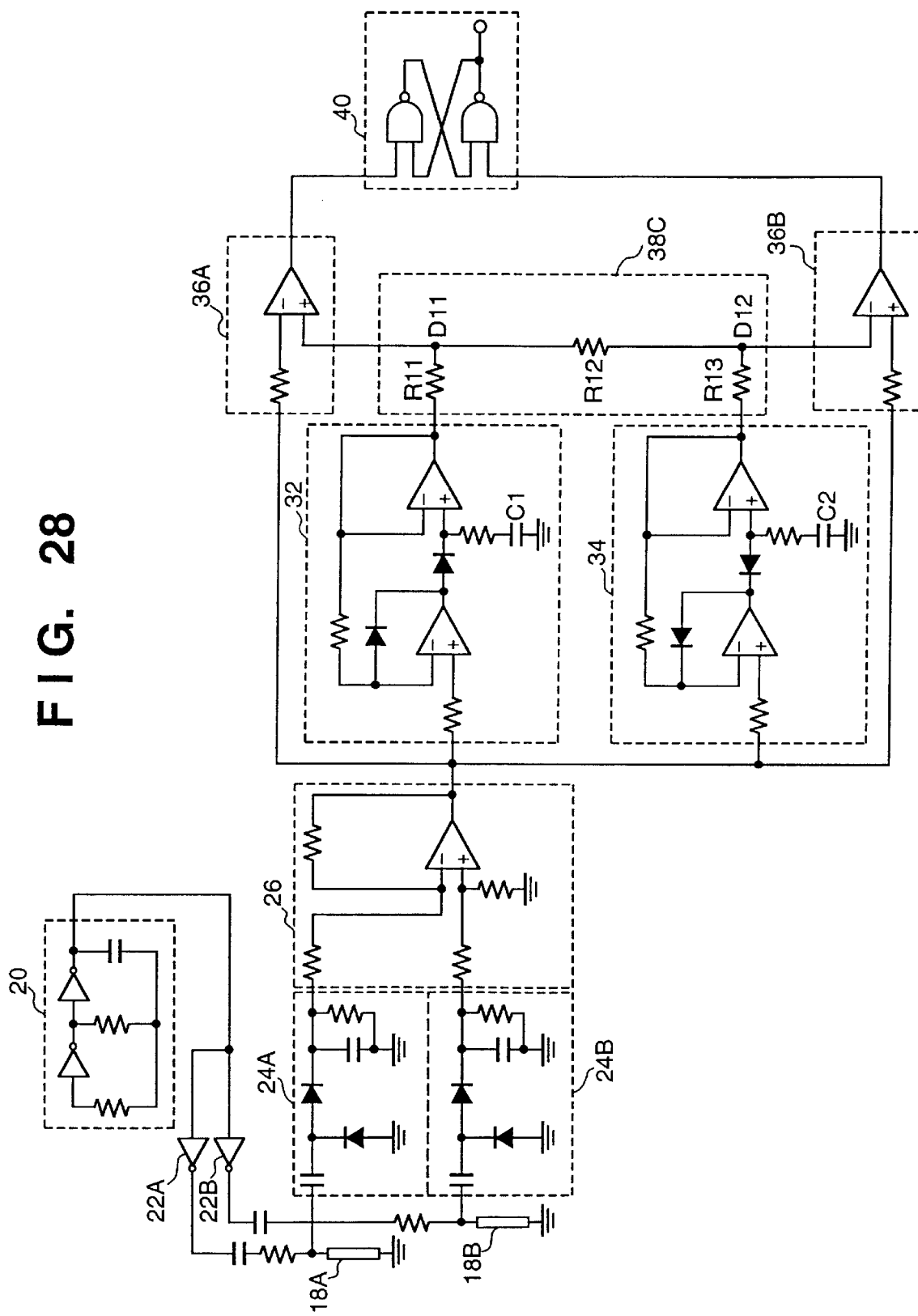
FIG. 28 is a circuit diagram showing the arrangement of a magnetic detection circuit of a magnetic sensor according to the third embodiment.

FIG. 28 is a circuit diagram of a tire revolution detection apparatus of the third embodiment. Note that the same reference numerals denote parts common to those in the first and second embodiments, a detailed description thereof will be omitted, and only differences will be explained below.

This embodiment differs from the first and second embodiments in that the outputs from the maximum and minimum hold circuits 32 and 34 are directly connected via resistors R11, R12, and R13, so that voltage division points D11 and D12 between adjacent resistors are used as the threshold values of the comparators 36A and 36B.

With this method, the threshold values can be set across the zero potential regardless of the relative position of the zero potential.

Figure 29:
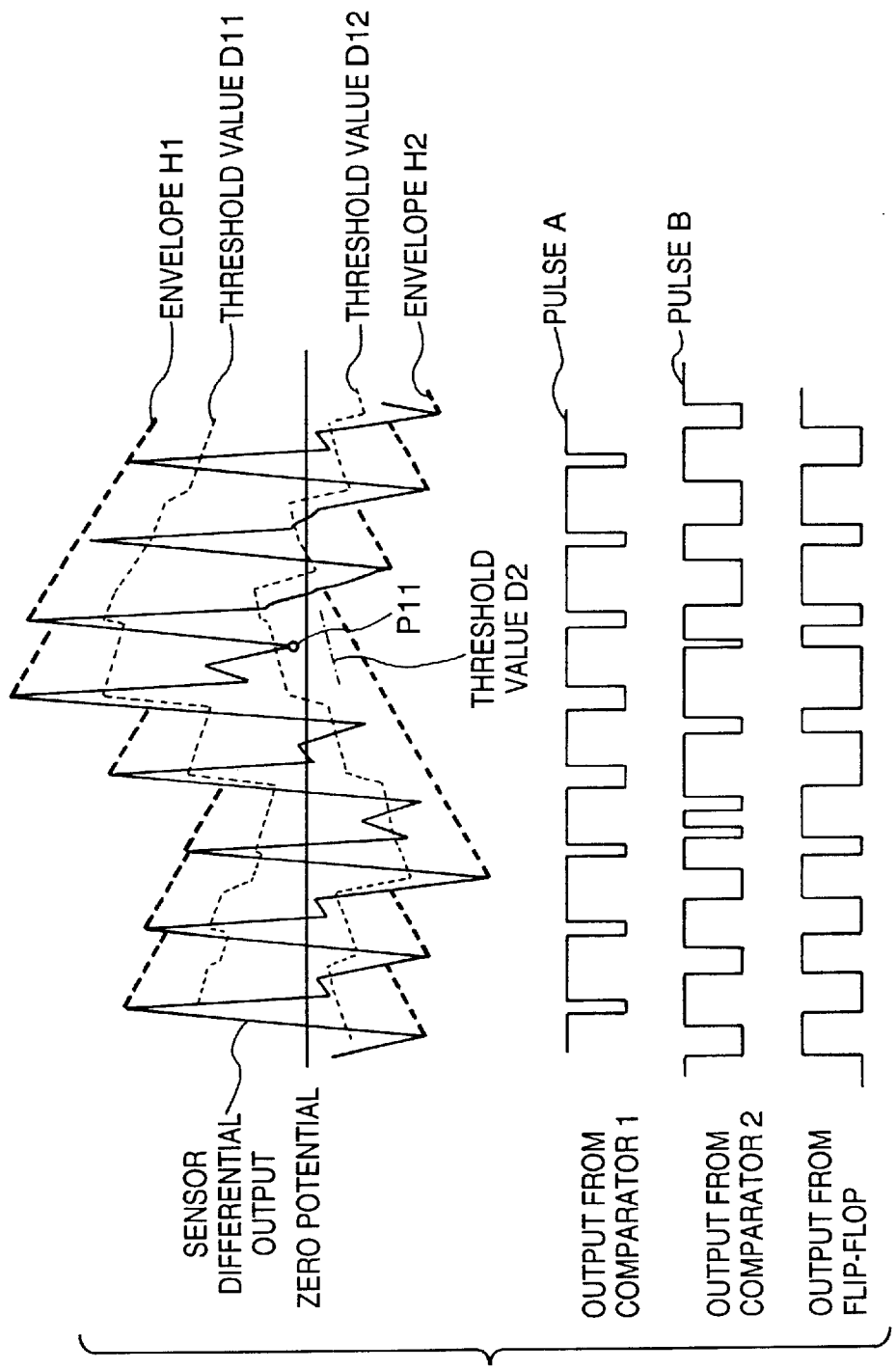
FIG. 29 is a waveform chart showing signal waveforms in the individual circuits to explain the operation of the circuit shown in FIG. 28.

FIG. 29 shows an example wherein the voltage division resistors R11, R12, and R13 are set at 1:2:1. In FIG. 29, at the position of a peak P11 where the differential output of the sensor exceeds the zero potential, a threshold value indicated by a broken line D2 is set in the first embodiment, and does not cross the sensor output. However, a threshold value D12 set by the circuit shown in FIG. 28 forms a crossing point, and pulse errors can be avoided.

The voltage division ratio defined by the resistors can be considered in the same manner as in the first embodiment for the purpose of removing pseudo peaks, and the difference between the plus peak hold voltage and plus threshold value voltage, and the difference between the minus peak hold voltage and minus threshold value voltage need only fall within the range from 10% to 90% of the difference between the plus and minus peak hold voltages.

Figure 30:
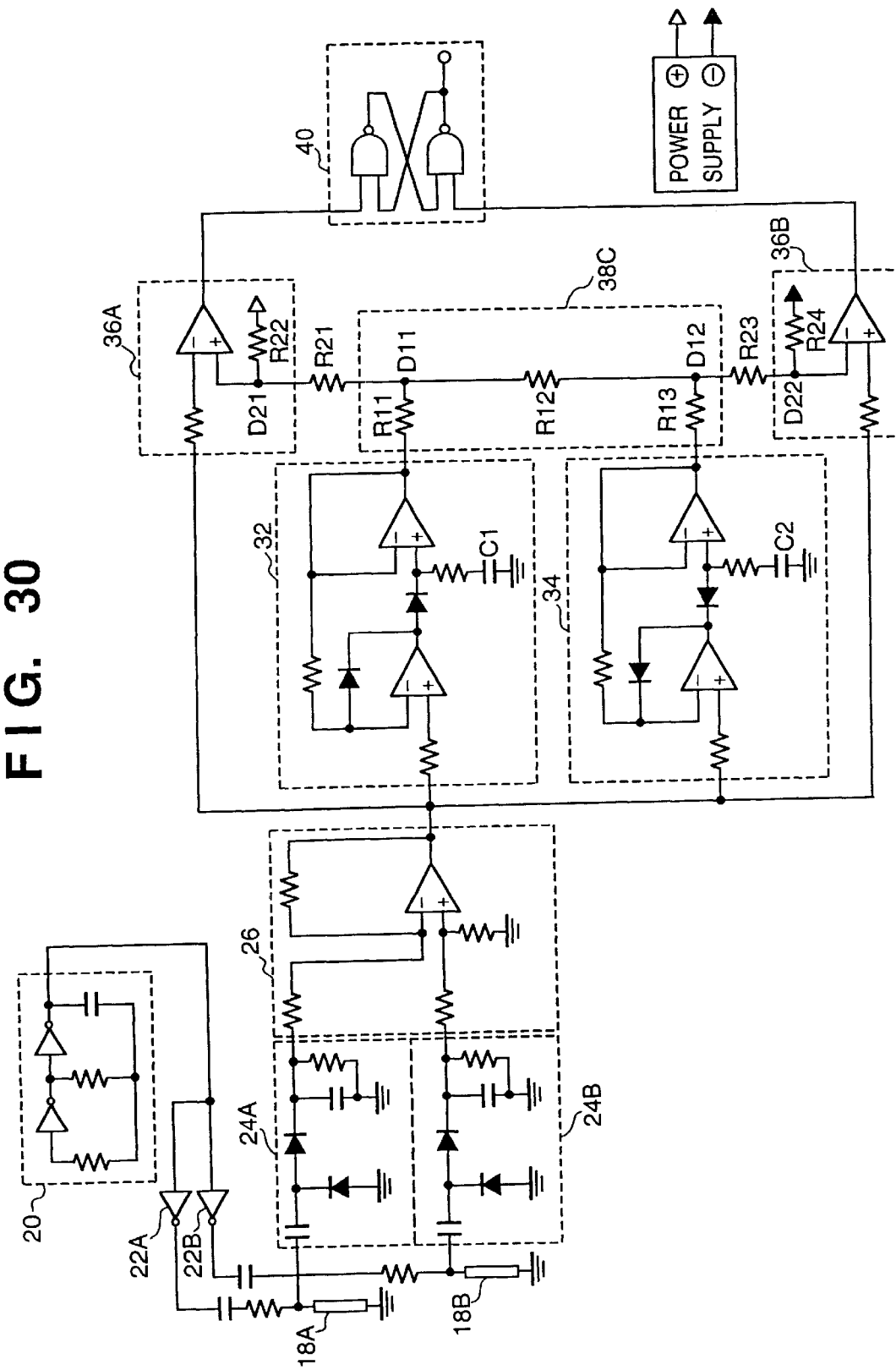
FIG. 30 is a circuit diagram showing another arrangement of the magnetic detection circuit shown in FIG. 28.

In the circuit shown in FIG. 28, when the tire is at rest, the threshold values D11 and D12 approach each other, and convert noise components into pulses. For this reason, a dead zone must be assured, and in practice, a circuit arrangement shown in FIG. 30 is desirable.

In this method, the threshold value D11 is connected to a voltage source higher than the value D11, e.g., a+power supply via resistors, and the threshold value D12 is connected to a voltage source lower than the value D12, e.g., a−power supply via resistors, so as to set threshold values D21 and D22 by voltage division. With this arrangement, when the tire lies motionless, a potential difference larger than a noise level can be assured between the threshold values D21 and D22, thus preventing noise components from being converted into pulses.

[Tire Revolution Detection Apparatus of Fourth Embodiment]

Tire revolution detection of this embodiment further suffers the following problem.

The magnetic sensor of the tire revolution detection apparatus must be set to be attached as easily as possible independently of the types of vehicles. However, when the tire and sensor setting position are separated away from each other, since the magnetic field from the tire becomes weak, the sensor sensitivity drops, and it is often hard to find the setting position or the sensor cannot be attached in the worst case.

For example, in the case of an RV vehicle or 4WD (4 WHEEL DRIVE) vehicle, the tire and sensor setting position often have a larger distance than in normal vehicles. Also, in other types of vehicles, when a seat is present on the back side of a tire housing like in a one-box vehicle, a sensor setting position in the vicinity of the tire cannot often be assured.

When the distance becomes larger, the magnitude of the magnetic field from the tire becomes smaller, and the difference between the magnetic fields detected by the two magnetic detection elements that attain differential detection also becomes smaller. As a result, the differential amplifier output cannot be stably obtained.

In the fourth embodiment, the apparatus arrangement of the first embodiment described above is improved to solve this problem. The apparatus of the fourth embodiment will be described below with reference to FIGS. 31 to 38.

Figure 31:
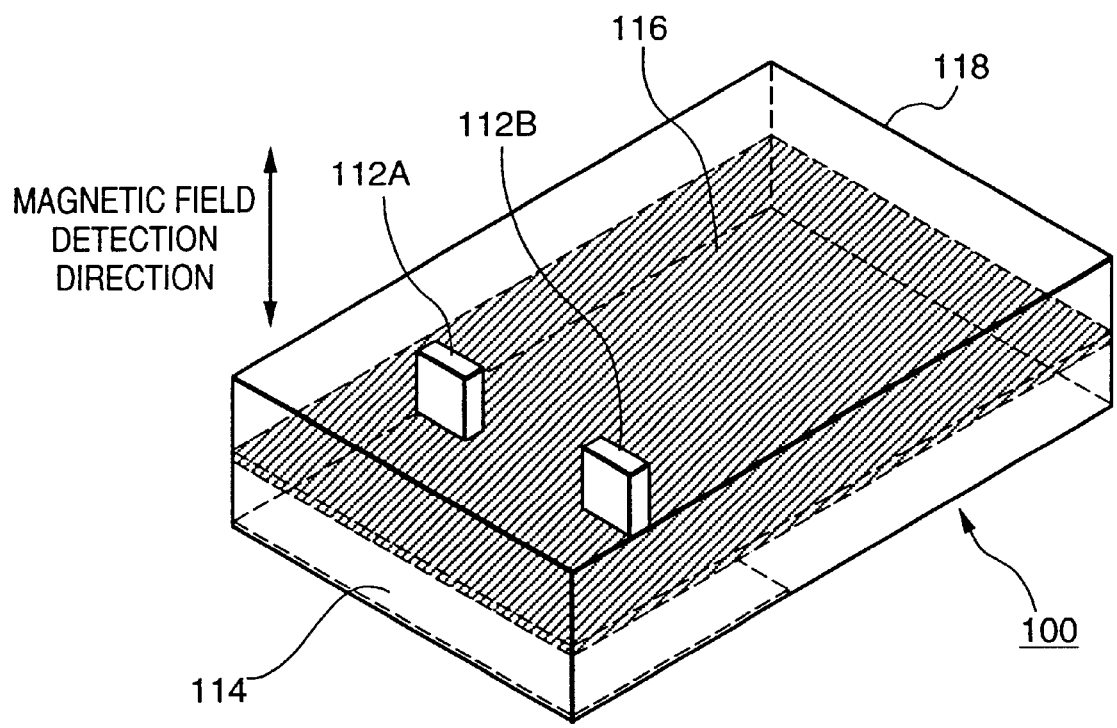
FIG. 31 is a perspective view showing a magnetic sensor that builds a tire revolution detection apparatus according to the fourth embodiment.

FIG. 31 depicts the arrangement of a magnetic sensor 100 that builds the tire revolution detection apparatus of the fourth embodiment.

As shown in FIG. 31, a pair of magnetic detection elements 112A and 112B are juxtaposed at a predetermined interval on a sensor circuit board 116 arranged in a case 118 of the magnetic sensor 100. The magnetic field detection directions of these magnetic detection elements 112A and 112B agree with each other, i.e., are parallel to each other, and are set in a direction perpendicular to the sensor circuit board 116, as indicated by a double-headed arrow in FIG. 31.

The magnetic detection elements 112A and 112B preferably comprise the above-mentioned MI elements. In this case, the circuit shown in one of FIGS. 2, 8, 25, 26, and 28 is mounted on the sensor circuit board, and the differential detection of the tire magnetic field and the revolution detection are attained by the above-mentioned circuit operation. In this case, as described in the above tire magnetic field detection method, the magnetic sensor 100 is set so that the magnetic field detection directions of the magnetic detection elements 112A and 112B are parallel to the side surface of the tire, and the magnetic detection elements 112A and 112B are juxtaposed in a direction perpendicular to the side surface of the tire.

On the other hand, as a constituting element of the fourth embodiment, a lead plate 114 is fixed on the. bottom surface of the case 118 immediately below the magnetic detection elements 112A and 112B. The lead plate 114 guides the magnetic fluxes from the tire 12, and is made up of a magnetic member having high magnetic permeability (especially, in the band from DC to AC magnetic fields of several hundred Hz), e.g., a permalloy, amorphous magnetic member, ferrite, or the like. In this embodiment, the plate 114 is formed into a rectangular planar shape. The lead plate 114 is set to be parallel to a line connecting the magnetic detection elements 112A and 112B, and to be perpendicular to the magnetic field detection directions of the magnetic detection elements 112A and 112B, i.e., to be parallel to the sensor circuit board 116.

The lead plate 114 is set to be parallel to the line connecting the magnetic detection elements 112A and 112B so as to equalize the influences of disturbance magnetic fields and to efficiently cancel such disturbances by differential detection. Also, the lead plate 114 is set to be perpendicular to the magnetic field detection direction in order to assure a large magnetic field difference required for differential detection. The reason for this will be described later.

The effect of the lead plate 114 will be explained below.

The examination results of the influences of the lead plate 114 on the magnetic field from the tire will be described. In the examinations, as shown in FIG. 32, five pairs of measurement points A to E were set at 80-mm intervals on line (1) separated by 150 mm from the side surface of the tire 12 to be parallel to the side surface, and on line (2) separated by 30 mm from the side surface of the tire 12 in a direction perpendicular thereto, the magnetic detection elements 112A and 112B were respectively set on the (1) and (2) sides of each pair of measurement points, the magnetic field upon revolution of the tire was simultaneously measured at the individual pairs of measurement points, and data with and without a lead plate were compared.

Figure 32:
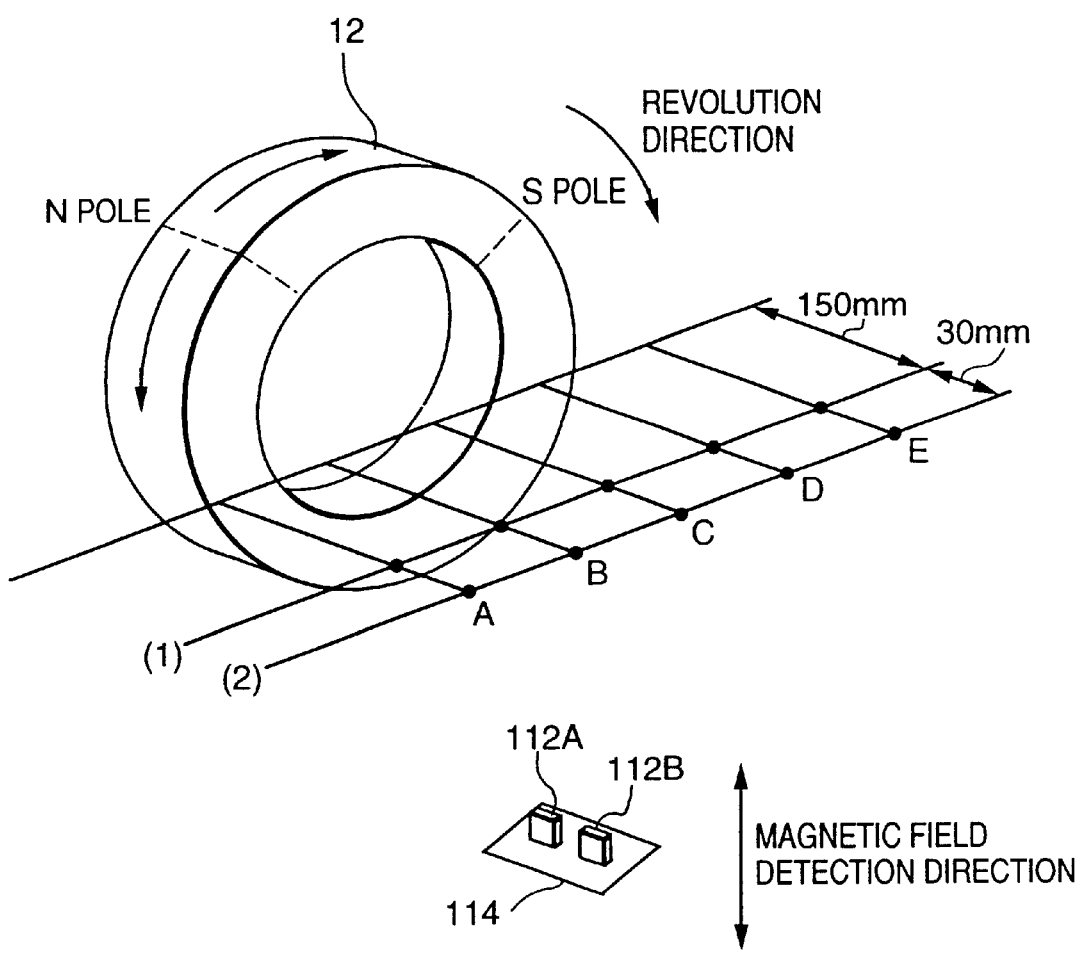
FIG. 32 is a view for explaining the tire magnetic field measurement method to check the effect of a lead plate of the magnetic sensor shown in FIG. 31.

The magnetic detection elements 112A and 112B used MI elements with high sensitivity, and their magnetic field detection directions agreed with the up-and-down directions in FIG. 32, which was parallel to the side surface of the tire 12, as indicated by a double-headed arrow.

The lead plate 114 prepared was made up of a permalloy containing 78% of nickel and had a planar shape (25 mm (W)×47 mm (L)×0.2 mm (T)). Such lead plate 114 was set at a position 8.5 mm below the two magnetic detection elements 112A and 112B to be parallel to a line connecting the magnetic detection elements and to be perpendicular to the magnetic field detection directions.

The tire 12 used had an outer diameter Φ=50 cm and included a steel belt in its outer circumferential portion. After the entire perimeter of the tire 12 was magnetized in one direction, its 90° range was magnetized in the opposite direction.

Figure 33:
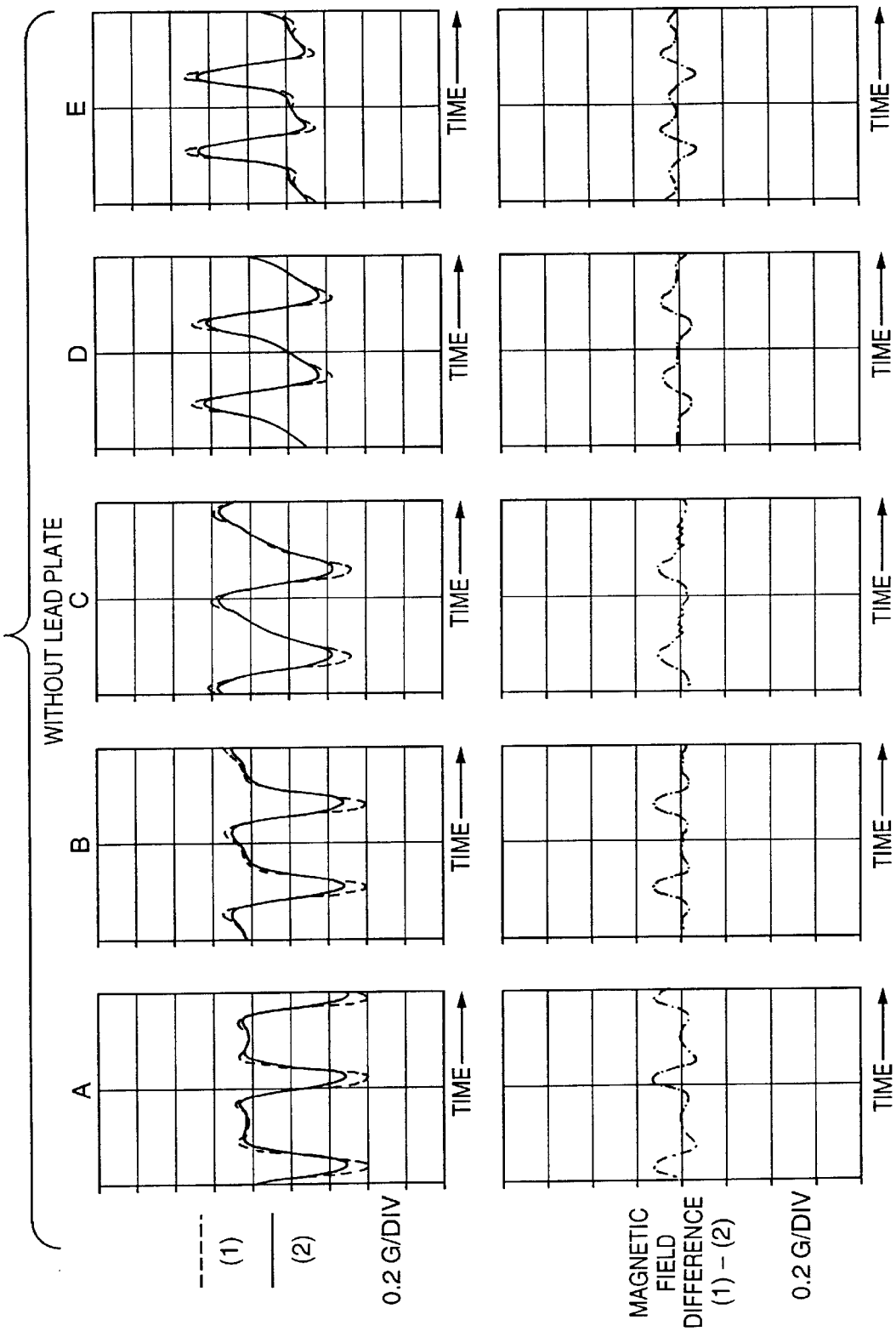
FIG. 33 is a waveform chart showing, as the measurement results of FIG. 32 without any lead plate, the waveforms of the magnetic fields at the individual measurement points and changes in their differences.
Figure 34:
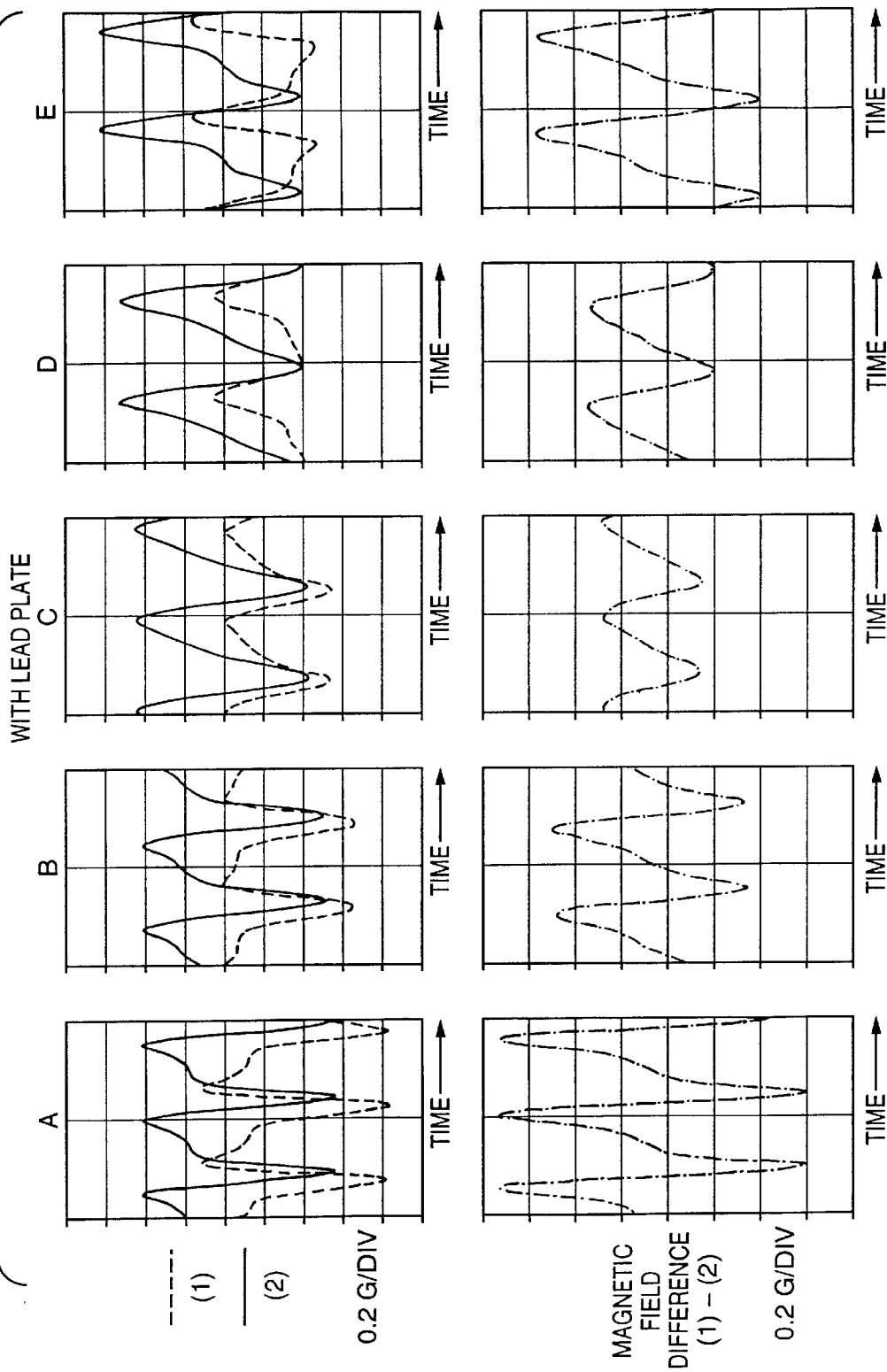
FIG. 34 is a waveform chart showing, as the measurement results of FIG. 32 with a lead plate, the waveforms of the magnetic fields at the individual measurement points and changes in their differences.

FIGS. 33 and 34 show the magnetic field measurement results and the magnetic field differences at the measurement points on lines (1) and (2) shown in FIG. 32. When no lead plate is used, as shown in FIG. 33, the magnetic fields measured at the measurement points on line (1) closer to the tire are larger than those measured at the measurement points on line (2) farther from the tire, the waveforms are roughly the same, and are in phase with each other. However, when the lead plate is used, as shown in FIG. 34, the magnetic fields measured at the measurement points on line (2) farther from the tire are larger than those measured at the measurement points on the line (1), and the waveforms of the magnetic fields measured at the points on lines (1) and (2) are clearly out of phase with each other. Especially, at measurement points A and E closer to the outer circumferential portion of the tire, they are nearly 90° out of phase.

Figure 35:
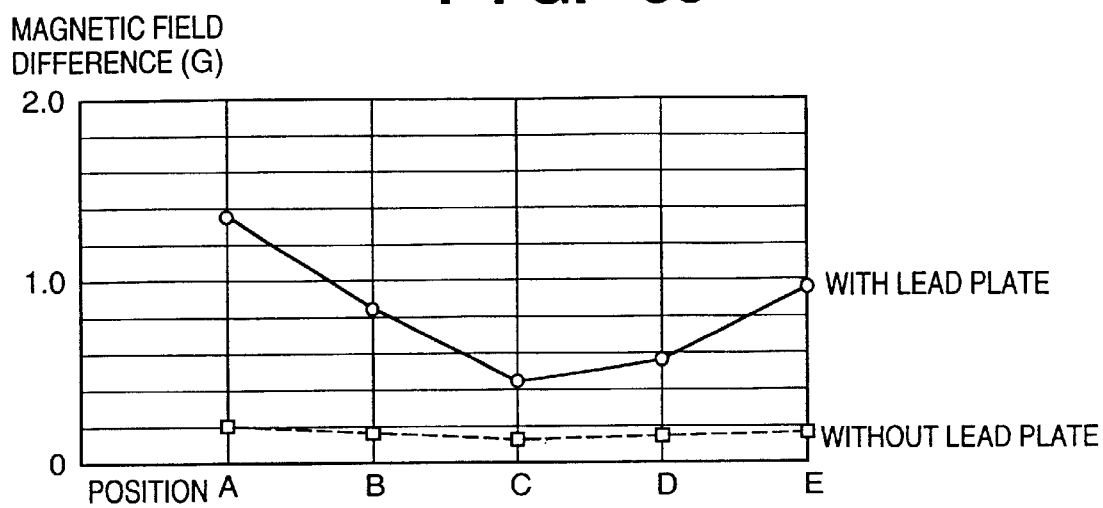
FIG. 35 is a graph showing, as the measurement results of FIG. 32 with and without a lead plate, the peak-to-peak values of the magnetic field differences at the individual measurement points.

As a result, as shown in FIG. 35 that shows the peak-to-peak values at measurement points A to E, the magnetic field difference between (1) and (2) associated with differential detection obtained when the lead plate is set becomes several times larger than that obtained when no lead plate is set. Especially, the magnetic field differences at points closer to the outer circumferential portion of the tire (measurement points A and E) become large.

In the two magnetic detection elements set on extended lines of measurement points (1) and (2), the magnitudes and phases of the magnetic fields change depending on the presence/absence of the lead plate because the magnetic field increases since magnetic fluxes from the tire are attracted by the lead plate and are concentrated, and the detected magnetic fields have a phase difference therebetween since the effect of the lead plate differs due to different distances between the end of the lead plate on the tire side and the two magnetic detection elements.

To summarize, the effects of using the lead plate are:
(i) to increase the detected magnetic field itself since magnetic fluxes from the tire are attracted by the lead plate; and
(ii) to assure a large magnetic field difference required for differential amplification since a phase difference is produced between the magnetic fields detected by the two magnetic detection elements.

The way of setting the lead plate will be explained below. The lead plate has an optimal position with respect to the magnetic detection elements, and is preferably set in a direction perpendicular to the magnetic field detection directions of the magnetic detection elements.

Figure 36:
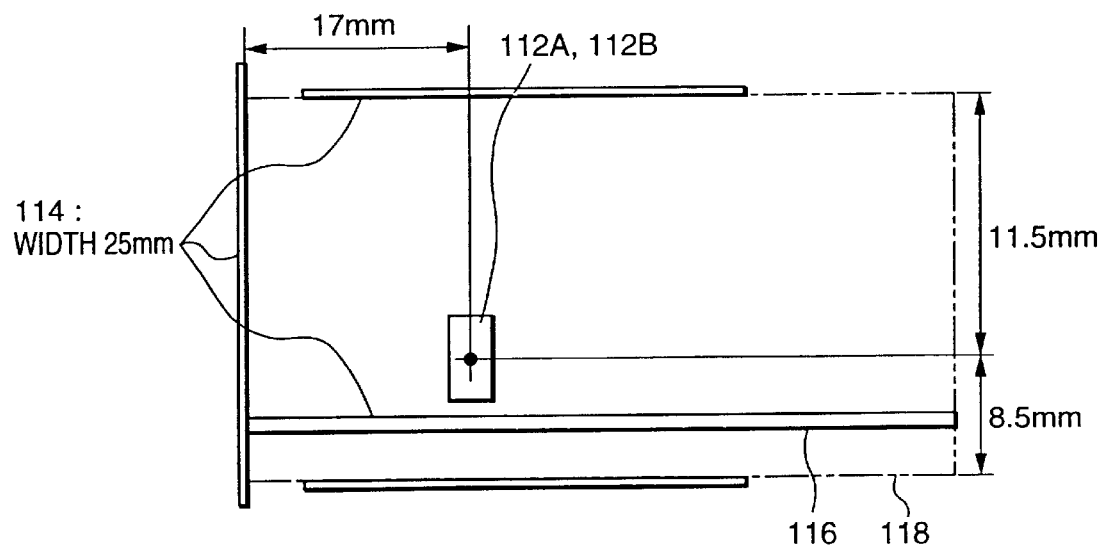
FIG. 36 is a view showing the layout method of the lead plate.

To confirm the optimal position, the lead plate 114 was temporarily detached from the arrangement of the magnetic sensor 100 shown in FIG. 31, and was set on the outer lower surface, side surface, upper surface, and upper and lower surfaces of the case 118, as shown in FIG. 36. At these positions, the magnetized tire was revolved in the vicinity of the sensor, and the sensor outputs were compared. Table 1 below shows the measurement results.

TABLE 1

| No Lead Plate | On Lower Surface | On Side Surface | On Upper Surface | On Upper and Lower Surfaces |
|---|---|---|---|---|
| 0.7 V | 1.7 V | 0.2 V | 1.2 V | 0.4 V |

As can be seen from these results, it is important to set the lead plate in a direction perpendicular to the magnetic field detection directions of the magnetic detection elements. The output for the lower surface is different from that for the upper surface since the lead plate placed on the lower surface side is closer to the magnetic detection elements than that on the upper surface to emphasize the effect. If the same distance is set, no difference appears between the upper and lower surfaces.

When lead plates are set on both the upper and lower surfaces, they serve as a magnetic shield and decrease the magnetic field applied to the magnetic detection elements. Hence, the lead plate is preferably set either above or below the magnetic detection elements.

Finally, data in an actual vehicle will be described below.

Figure 37:
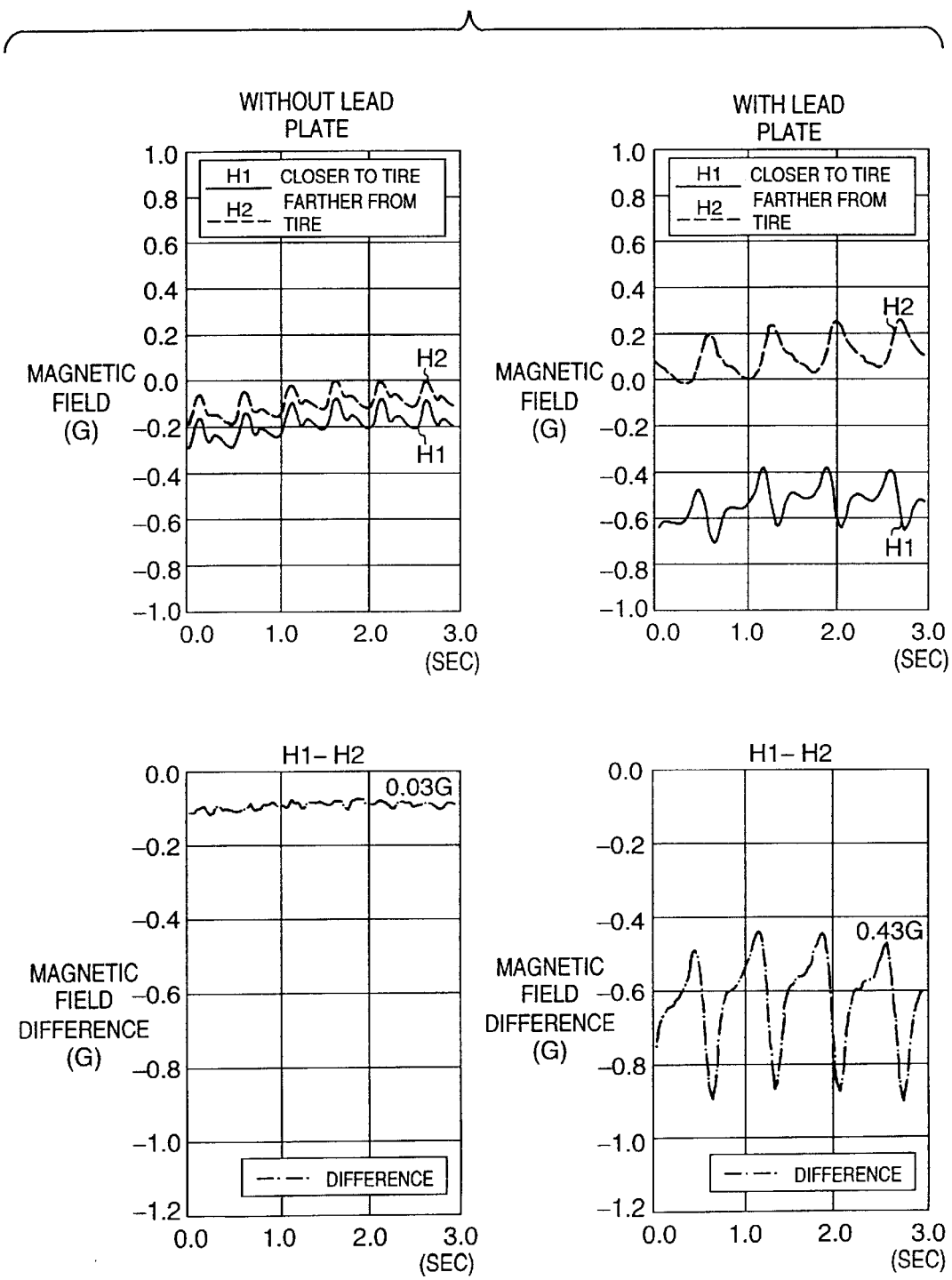
FIG. 37 is a waveform chart showing the measurement results of a tire magnetic field with and without a lead plate in an actual vehicle.

FIG. 37 shows the output difference of the magnetic sensor set in the cabin on the rear side of the rear tire of a certain RV vehicle depending on the presence/absence of a lead plate. When no lead plate is used, the peak-to-peak value of the magnetic field detected by a magnetic detection element H1 closer to the tire is 0.14 G, while when a lead plate is used, it is 0.25 G. As can be seen from FIG. 37, when a lead plate is used, the detected magnetic field itself becomes large, and a magnetic field difference one order of magnitude larger than that obtained without any lead plate can be assured due to the phase difference effect.

Figure 38:
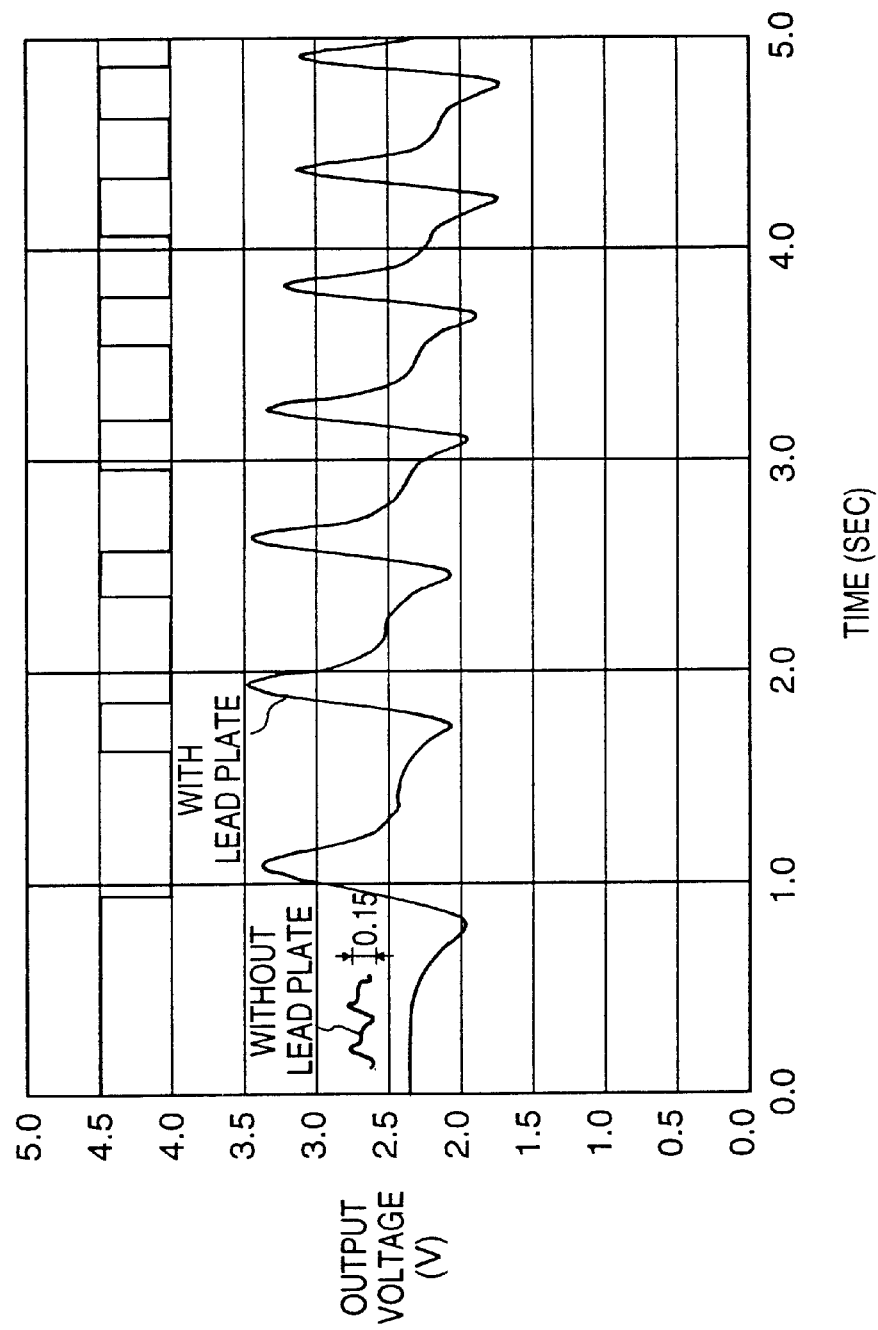

As a result, the sensitivity of the sensor output can be improved nearly ten-fold, and the differential amplifier gain of the circuit can be improved 35-fold. As shown in FIG. 38, the output obtained without any lead plate is 0.15 Vpp, while the output obtained with a lead plate is 1.4 Vpp.

In the fourth embodiment, the lead plate 114 has a rectangular planar shape, but may have other shapes such as an elliptic shape. Also, the lead plate need not be flat, but may be curved or bent. Furthermore, in place of the planar shape, other shapes such as a block shape and the like may be used.

Note that the present invention can be applied to changes or modifications of the above embodiments without departing from the scope of the invention.

As can be seen from the above description, according to the above embodiment, in a tire revolution detection apparatus which detects the revolution of a tire by detecting the magnetic field produced by residual magnetization on a steel belt of the tire using a magnetic sensor, and its signal processing method, the maximum and minimum peaks of the magnetic sensor output are held, the voltages between the hold voltages and a predetermined potential near zero potential are voltage-divided at a predetermined voltage division ratio to set plus and minus threshold values, the magnetic sensor output is compared with the plus and minus threshold value voltages to obtain a first pulse signal corresponding to the plus peak of the magnetic sensor output and a second pulse signal corresponding to the minus peak of the magnetic sensor output, and a pulse signal which rises in response to one of the first and second pulse signals and falls in response to the other is generated as a tire revolution detection signal.

Hence, not only level drifts of the sensor output due to disturbances but also sensor output variations can be absorbed, and the signal processing is robust against waveform distortions of the sensor output, thus obtaining a highly reliable tire revolution detection output pulse from the sensor output.

In this manner, in place of the conventional, cost-and labor-intensive connection between the vehicle main body and the car navigation apparatus to acquire vehicle speed data, a tire revolution detection apparatus which can be easily set and can obtain a highly reliable tire revolution detection output can be supplied and, hence, further extension of the market of car navigation apparatuses can be expected.

Also, the above-mentioned embodiment can provide a tire magnetization method used for detecting the revolution of a tire by externally detecting the magnetic field produced by residual magnetization on a steel belt of the tire that has the steel belt in its outer circumferential portion, and for magnetizing the tire by bringing a magnetization magnet into contact with or close to the outer circumferential surface of the tire, and relatively moving the magnet along the circumferential direction of the tire so that the magnetic field generated by the magnet runs in the circumferential direction of the tire, wherein in. the first magnetization process, the entire perimeter of the outer circumferential portion of the tire is continuously magnetized in one direction agreeing with the circumferential direction, and thereafter, in the second magnetization process, a predetermined angle range smaller than 360° on the outer circumferential portion of the tire is continuously re-magnetized in a direction opposite to the one direction, and a magnetization method, wherein in the first magnetization process, a predetermined angle range smaller than 360° on the outer circumferential portion of the tire is continuously magnetized in one direction agreeing with the circumferential direction, and in the second magnetization process, at least a non-magnetized portion which remains non-magnetized in the first magnetization process is continuously magnetized in a direction opposite to the one direction. With this method, a periodic magnetic field can be stably generated from the tire per revolution of the tire, and in magnetic revolution detection of the tire magnetized by this method, one pulse signal can be stably obtained per revolution of the tire. Hence, a magnetization method suitable for magnetic revolution detection of a tire can be provided.

In the above-mentioned magnetization method of the above embodiment, especially, the angle of a smaller one of the angle ranges of residual magnetization portions in opposite directions on the outer circumferential portion of the tire magnetized in the first and second magnetization processes is set to fall within the range from 30° to 180° and, more preferably, the range from 55° to 105°. With this setting, a broad margin upon setting the threshold value for the magnetic sensor output in revolution detection of the tire can be set, and the detection operation can become strong against level drifts of the magnetic sensor outputs due to disturbance magnetic fields.

Furthermore, the above-mentioned embodiment can provide a tire magnetization method wherein the entire perimeter of the outer circumferential portion of the tire is equally divided into four 90° ranges, and these ranges are magnetized to alternately have opposite directions along the circumferential direction of the tire. With this method, a magnetic pattern which has two peaks per revolution of the tire in changes in magnetic field upon revolution of the tire can be generated. In magnetic revolution detection of the tire magnetized by this method, two pulse signals can be stably obtained per revolution of the tire, and measurement errors of the distance traveled of a vehicle upon revolution detection of the tire can be reduced, thus improving the precision of the self-contained navigation of the car navigation apparatus.

Further, the above-mentioned embodiment can provide a tire magnetic field detection method for differentially detecting the magnetic field produced by residual magnetization on a steel belt of a tire magnetized by one of the above magnetization methods using two magnetic detection elements, wherein the magnetic field detection directions of the two magnetic detection elements are parallel to the side surface of the tire and the two magnetic detection elements are juxtaposed in a direction perpendicular to the side surface of the tire upon differential detection. With this method, even when the detection position changes slightly, the waveform and phase of the detection output do not change largely, and a margin for setting the threshold value can be stably assured. Hence, the magnetic sensor constituted by the two magnetic detection elements can be easily set.

According to the above embodiment, in tire revolution detection signal processing, when the outputs from maximum and minimum hold circuits are directly connected via a plurality of resistors to set two voltage division points, and the plus and minus voltage division points are respectively connected to comparators as plus and minus threshold values, output pulses can be stably supplied even for the sensor differential output that suffers very large disturbances.

According to the above embodiment, in a tire revolution detection apparatus which externally, differentially detects the magnetic field produced by residual magnetization on a steel belt of a tire using a pair of magnetic detection elements juxtaposed at a predetermined interval, and detects the revolution of the tire on the basis of the detection results, a magnetic member that guides magnetic fluxes from the tire is set in the vicinity of the pair of magnetic detection elements. With this apparatus, the magnetic field from the tire can be differentially detected with very high sensitivity, and the S/N ratio of the differential output can be remarkably improved. Hence, a tire revolution detection apparatus which can satisfactorily detect the revolution of the tire even when the distance between the tire and the setting position of the tire revolution detection apparatus becomes slightly large, and can be easily set independently of the types of vehicles, can be provided.

As many apparently widely different embodiments of the present invention can be made without departing from the spirit and scope thereof, it is to be understood that the invention is not limited to the specific embodiments thereof except as defined in the appended claims.

What is claimed is:

1. A method for detecting magnetic fields produced by residual magnetization on a steel belt embedded in an outer circumferential portion of a tire, the method comprising:

magnetizing a first portion of said steel belt over a first predetermined angle extending less than 360° along a first circumferential direction of the tire so that a first magnetic field having a first polarity extends in said first circumferential direction of the tire;

magnetizing a second portion of said steel belt over a second predetermined angle in a second circumferential direction of the tire opposite to said first circumferential direction so that a second magnetic field having a second polarity and opposite to said first polarity extends in said second circumferential direction of the tire;

positioning a first magnetic detection element so that a magnetic field detection direction of said first magnetic detection element is parallel to a side surface of the tire;

positioning a second magnetic detection element so that a magnetic field detection direction of the second magnetic detection element is parallel to the side surface of the tire, wherein said first magnetic detection element and said second magnetic detection element are juxtaposed in a direction perpendicular to the side surface of the tire during detection.

2. The method according to claim 1, wherein one of said first predetermined angle or said second predetermined angle is within a range of about 30° to 180°.

3. The method according to claim 1, wherein one of said first predetermined angle or said second predetermined angle is within a range of about 55° to 105°.

4. A method for detecting a magnetic field produced by residual magnetization on a steel belt embedded in an outer circumferential portion of a tire, the method comprising:

magnetizing a portion of said steel belt over a predetermined angle range extending less than 360° along a circumferential direction of the tire, positioning two magnetic detection elements such that a magnetic field detection direction of each of said two magnetic detection elements are parallel to a side surface of the tire and are juxtaposed in a direction perpendicular to the side surface of the tire during detection.

* * * * *

UNITED STATES PATENT AND TRADEMARK OFFICE
CERTIFICATE OF CORRECTION

PATENT NO. : 6,404,182 B1
DATED : June 11, 2002
INVENTOR(S) : Kawase et al.

It is certified that error appears in the above-identified patent and that said Letters Patent is hereby corrected as shown below:

<u>Column 3,</u>
Lines 33-34, "in a bridge;" should read -- on a bridge; --

<u>Column 5,</u>
Line 67, "member hanges" should read -- member changes --

<u>Column 6,</u>
Line 1, "external –magnetic field," should read -- external magnetic field, --
Line 23, "sensor 14." should read -- sensor 14 --
Line 26, "an RF. oscillation" should read -- an RF oscillation --
Line 49, "d>2 cm." should read -- d$\geq$2 cm. --
Line 54, "drops. with" should read -- drops with --
Line 55, "wire length,. as" should read -- wire length, as --

<u>Column 8,</u>
Line 42, "to the a differential" should read -- to the differential --

<u>Column 9,</u>
Line 22, "the,absolute" should read -- the absolute --
Line 30, "set,to" should read -- set to --
Line 57, "are:determined" should read -- are determined --

<u>Column 10,</u>
Line 30, "MI. elements," should read -- MI elements, --

<u>Column 11,</u>
Line 12, "In view. of" should read -- In view of --

<u>Column 13,</u>
Line 44, "done. based" should read -- done based --

<u>Column 14,</u>
Line 11, "in-the" should read -- in the --
Line 40, "second. embodiment,." should read -- second embodiment, --

UNITED STATES PATENT AND TRADEMARK OFFICE
CERTIFICATE OF CORRECTION

PATENT NO. : 6,404,182 B1
DATED : June 11, 2002
INVENTOR(S) : Kawase et al.

It is certified that error appears in the above-identified patent and that said Letters Patent is hereby corrected as shown below:

Column 15,
Line 2, "is magnetized." should read -- is magnetized --
Line 3, "the. circumferential" should read -- the circumferential --
Line 5, "detection. direction" should read -- detection direction --
Line 13, "the, magnetic" should read -- the magnetic --

Column 17,
Line 64, "at. the" should read -- at the --

Column 18,
Line 14, "and-the" should read -- and the --
Line 27, "(1),.but" should read -- (1), but --
Line 30, "that. take" should read -- that take --

Column 20,
Line 64, "influences. of "should read -- influences of --

Column 22,
Line 66, "the. bottom" should read -- the bottom --

Column 25,
Line 63, "in. the" should read -- in the --

Signed and Sealed this

Nineteenth Day of November, 2002

*Attest:*

JAMES E. ROGAN
*Attesting Officer*     *Director of the United States Patent and Trademark Office*